United States Patent
Hodge

(10) Patent No.: US 12,175,189 B2
(45) Date of Patent: *Dec. 24, 2024

(54) SYSTEM AND METHOD FOR ANALYZING AND INVESTIGATING COMMUNICATION DATA FROM A CONTROLLED ENVIRONMENT

(71) Applicant: **Global Tel*Link Corporation**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,877

(22) Filed: Dec. 8, 2022

(65) Prior Publication Data

US 2023/0177260 A1 Jun. 8, 2023

Related U.S. Application Data

(63) Continuation of application No. 17/113,909, filed on Dec. 7, 2020, now Pat. No. 11,526,658, which is a
(Continued)

(51) Int. Cl.
*G06F 16/00* (2019.01)
*G06F 40/169* (2020.01)
(Continued)

(52) U.S. Cl.
CPC .......... *G06F 40/169* (2020.01); *G06F 40/279* (2020.01); *G10L 15/26* (2013.01);
(Continued)

(58) Field of Classification Search
None
See application file for complete search history.

(56) References Cited

U.S. PATENT DOCUMENTS 4,054,756 A 10/1977 Comella et al.
4,191,860 A 3/1980 Weber
(Continued)

FOREIGN PATENT DOCUMENTS

EP 1280137 B1 12/2004
EP 2579676 A1 4/2013
(Continued)

OTHER PUBLICATIONS

"Cisco IAD2400 Series Business-Class Integrated Access Device", Cisco Systems Datasheet, 2003; 8 pages.
(Continued)

*Primary Examiner* — Jean M Corrielus
(74) *Attorney, Agent, or Firm* — Sterne, Kessler, Goldstein & Fox P.L.L.C.

(57) ABSTRACT

The growing amount of communication data generated by inmates in controlled environments makes a timely and effective investigation and analysis more and more difficult. The present disclosure provides details of a system and method to investigate and analyze the communication data in a correctional facility timely and effectively. Such a system receives both real time communication data and recorded communication data, processes and investigates the data automatically, and stores the received communication data and processed communication data in a unified data server. Such a system enables a reviewer to review, modify and insert markers and comments for the communication data. Such a system further enables the reviewer to search the communication data and create scheduled search reports.

20 Claims, 7 Drawing Sheets

Related U.S. Application Data continuation of application No. 15/611,408, filed on Jun. 1, 2017, now Pat. No. 10,860,786.

(51) Int. Cl.
  *G06F 40/279* (2020.01)
  *G10L 15/26* (2006.01)
  *H04L 51/216* (2022.01)
  *H04L 51/56* (2022.01)
  *H04L 67/50* (2022.01)
  *H04L 51/04* (2022.01)

(52) U.S. Cl.
  CPC ............ *H04L 51/216* (2022.05); *H04L 51/56* (2022.05); *H04L 67/535* (2022.05); *H04L 51/04* (2013.01)

(56) References Cited

U.S. PATENT DOCUMENTS

| | | |
|---|---|---|
| 4,670,628 A | 6/1987 | Boratgis et al. |
| 4,675,659 A | 6/1987 | Jenkins, Jr. et al. |
| 4,691,347 A | 9/1987 | Stanley et al. |
| 4,737,982 A | 4/1988 | Boratgis et al. |
| 4,813,070 A | 3/1989 | Humphreys et al. |
| 4,907,221 A | 3/1990 | Pariani et al. |
| 4,918,719 A | 4/1990 | Daudelin |
| 4,935,956 A | 6/1990 | Hellwarth et al. |
| 4,943,973 A | 7/1990 | Werner |
| 4,995,030 A | 2/1991 | Helf |
| 5,185,781 A | 2/1993 | Dowden et al. |
| 5,210,789 A | 5/1993 | Jeffus et al. |
| 5,229,764 A | 7/1993 | Matchett et al. |
| 5,291,548 A | 3/1994 | Tsumura et al. |
| 5,319,702 A | 6/1994 | Kitchin et al. |
| 5,319,735 A | 6/1994 | Preuss et al. |
| 5,345,501 A | 9/1994 | Shelton |
| 5,345,595 A | 9/1994 | Johnson et al. |
| 5,379,345 A | 1/1995 | Greenberg |
| 5,425,091 A | 6/1995 | Josephs |
| 5,438,616 A | 8/1995 | Peoples |
| 5,469,370 A | 11/1995 | Ostrover et al. |
| 5,471,318 A | 11/1995 | Ahuja et al. |
| 5,485,507 A | 1/1996 | Brown et al. |
| 5,502,762 A | 3/1996 | Andrew et al. |
| 5,517,555 A | 5/1996 | Amadon et al. |
| 5,526,407 A | 6/1996 | Russell et al. |
| 5,535,194 A | 7/1996 | Brown et al. |
| 5,535,261 A | 7/1996 | Brown et al. |
| 5,539,731 A | 7/1996 | Haneda et al. |
| 5,539,812 A | 7/1996 | Kitchin et al. |
| 5,544,649 A | 8/1996 | David et al. |
| 5,555,551 A | 9/1996 | Rudokas et al. |
| 5,583,925 A | 12/1996 | Bernstein |
| 5,590,171 A | 12/1996 | Howe |
| 5,592,548 A | 1/1997 | Sih |
| 5,613,004 A | 3/1997 | Cooperman |
| 5,619,561 A | 4/1997 | Reese |
| 5,627,887 A | 5/1997 | Freedman |
| 5,634,086 A | 5/1997 | Rtischev et al. |
| 5,634,126 A | 5/1997 | Norell |
| 5,636,292 A | 6/1997 | Rhoads |
| 5,640,490 A | 6/1997 | Hansen et al. |
| 5,646,940 A | 7/1997 | Hotto |
| 5,649,060 A | 7/1997 | Ellozy et al. |
| 5,655,013 A | 8/1997 | Gainsboro |
| 5,675,704 A | 10/1997 | Juang et al. |
| 5,687,236 A | 11/1997 | Moskowitz |
| 5,710,834 A | 1/1998 | Rhoads |
| 5,719,937 A | 2/1998 | Warren et al. |
| 5,745,558 A | 4/1998 | Richardson, Jr. et al. |
| 5,745,569 A | 4/1998 | Moskowitz |
| 5,745,604 A | 4/1998 | Rhoads |
| 5,748,726 A | 5/1998 | Unno |
| 5,748,763 A | 5/1998 | Rhoads |
| 5,748,783 A | 5/1998 | Rhoads |
| 5,757,889 A | 5/1998 | Ohtake |
| 5,768,355 A | 6/1998 | Salibrici |
| 5,768,426 A | 6/1998 | Rhoads |
| 5,774,452 A | 6/1998 | Greenberg |
| 5,793,415 A | 8/1998 | Gregory, III et al. |
| 5,796,811 A | 8/1998 | McFarlen |
| 5,805,685 A | 9/1998 | McFarlen |
| 5,809,462 A | 9/1998 | Nussbaum |
| 5,822,432 A | 10/1998 | Moskowitz |
| 5,822,436 A | 10/1998 | Rhoads |
| 5,832,068 A | 11/1998 | Smith |
| 5,832,119 A | 11/1998 | Rhoads |
| 5,835,486 A | 11/1998 | Davis et al. |
| 5,841,886 A | 11/1998 | Rhoads |
| 5,841,978 A | 11/1998 | Rhoads |
| 5,850,481 A | 12/1998 | Rhoads |
| 5,861,810 A | 1/1999 | Nguyen |
| 5,862,260 A | 1/1999 | Rhoads |
| 5,867,562 A | 2/1999 | Scherer |
| 5,883,945 A | 3/1999 | Richardson et al. |
| 5,889,868 A | 3/1999 | Seraphim et al. |
| 5,899,972 A | 5/1999 | Miyazawa et al. |
| 5,907,602 A | 5/1999 | Peel et al. |
| 5,915,001 A | 6/1999 | Uppaluru |
| 5,920,834 A | 7/1999 | Sih et al. |
| 5,923,746 A | 7/1999 | Baker et al. |
| 5,926,533 A | 7/1999 | Gainsboro |
| 5,930,369 A | 7/1999 | Cox et al. |
| 5,930,377 A | 7/1999 | Powell et al. |
| 5,937,035 A | 8/1999 | Andruska et al. |
| 5,953,049 A | 9/1999 | Horn et al. |
| 5,960,080 A | 9/1999 | Fahlman et al. |
| 5,963,909 A | 10/1999 | Warren et al. |
| 5,982,891 A | 11/1999 | Ginter et al. |
| 5,991,373 A | 11/1999 | Pattison et al. |
| 5,999,828 A | 12/1999 | Sih et al. |
| 6,011,849 A | 1/2000 | Orrin |
| 6,026,193 A | 2/2000 | Rhoads |
| 6,035,034 A | 3/2000 | Trump |
| 6,038,315 A | 3/2000 | Strait et al. |
| 6,052,454 A | 4/2000 | Kek et al. |
| 6,052,462 A | 4/2000 | Lu |
| 6,058,163 A | 5/2000 | Pattison et al. |
| 6,064,963 A | 5/2000 | Gainsboro |
| 6,072,860 A | 6/2000 | Kek et al. |
| 6,078,567 A | 6/2000 | Traill et al. |
| 6,078,645 A | 6/2000 | Cai et al. |
| 6,078,807 A | 6/2000 | Dunn et al. |
| 6,111,954 A | 8/2000 | Rhoads |
| 6,118,860 A | 9/2000 | Hillson et al. |
| 6,122,392 A | 9/2000 | Rhoads |
| 6,122,403 A | 9/2000 | Rhoads |
| 6,138,119 A | 10/2000 | Hall et al. |
| 6,141,406 A | 10/2000 | Johnson |
| 6,160,903 A | 12/2000 | Hamid et al. |
| 6,173,284 B1 | 1/2001 | Brown |
| 6,175,831 B1 | 1/2001 | Weinreich et al. |
| 6,185,416 B1 | 2/2001 | Rudokas et al. |
| 6,185,683 B1 | 2/2001 | Ginter et al. |
| 6,205,249 B1 | 3/2001 | Moskowitz |
| 6,211,783 B1 | 4/2001 | Wang |
| 6,219,640 B1 | 4/2001 | Basu et al. |
| 6,233,347 B1 | 5/2001 | Chen et al. |
| 6,237,786 B1 | 5/2001 | Ginter et al. |
| 6,243,480 B1 | 6/2001 | Zhao et al. |
| 6,243,676 B1 | 6/2001 | Witteman |
| 6,253,193 B1 | 6/2001 | Ginter et al. |
| 6,263,507 B1 | 7/2001 | Ahmad et al. |
| 6,266,430 B1 | 7/2001 | Rhoads |
| 6,278,772 B1 | 8/2001 | Bowater et al. |
| 6,278,781 B1 | 8/2001 | Rhoads |
| 6,289,108 B1 | 9/2001 | Rhoads |
| 6,301,360 B1 | 10/2001 | Bocionek et al. |
| 6,308,171 B1 | 10/2001 | De La Huerga |
| 6,312,911 B1 | 11/2001 | Bancroft |
| 6,314,192 B1 | 11/2001 | Chen et al. |
| 6,324,573 B1 | 11/2001 | Rhoads |
| 6,324,650 B1 | 11/2001 | Ogilvie |

(56) References Cited

U.S. PATENT DOCUMENTS

| | | |
|---|---|---|
| 6,330,335 B1 | 12/2001 | Rhoads |
| 6,343,138 B1 | 1/2002 | Rhoads |
| 6,343,738 B1 | 2/2002 | Ogilvie |
| 6,345,252 B1 | 2/2002 | Beigi et al. |
| 6,381,321 B1 | 4/2002 | Brown et al. |
| 6,389,293 B1 | 5/2002 | Clore et al. |
| 6,421,645 B1 | 7/2002 | Beigi et al. |
| 6,526,380 B1 | 2/2003 | Thelen et al. |
| 6,542,602 B1 | 4/2003 | Elazar |
| 6,560,323 B2 | 5/2003 | Gainsboro |
| 6,611,583 B1 | 8/2003 | Gainsboro |
| 6,625,261 B2 | 9/2003 | Holtzberg |
| 6,625,587 B1 | 9/2003 | Erten et al. |
| 6,633,846 B1 | 10/2003 | Bennett et al. |
| 6,636,591 B1 | 10/2003 | Swope et al. |
| 6,639,977 B1 | 10/2003 | Swope et al. |
| 6,639,978 B2 | 10/2003 | Draizin et al. |
| 6,647,096 B1 | 11/2003 | Milliorn et al. |
| 6,665,376 B1 | 12/2003 | Brown |
| 6,665,644 B1 | 12/2003 | Kanevsky et al. |
| 6,668,044 B1 | 12/2003 | Schwartz et al. |
| 6,668,045 B1 | 12/2003 | Mow |
| 6,671,292 B1 | 12/2003 | Haartsen |
| 6,688,518 B1 | 2/2004 | Valencia et al. |
| 6,728,345 B2 | 4/2004 | Glowny et al. |
| 6,728,682 B2 | 4/2004 | Fasciano |
| 6,748,356 B1 | 6/2004 | Beigi et al. |
| 6,760,697 B1 | 7/2004 | Neumeyer et al. |
| 6,763,099 B1 | 7/2004 | Blink |
| 6,782,370 B1 | 8/2004 | Stack |
| 6,788,772 B2 | 9/2004 | Barak et al. |
| 6,795,540 B1 | 9/2004 | Mow |
| 6,810,480 B1 | 10/2004 | Parker et al. |
| 6,850,609 B1 | 2/2005 | Schrage |
| 6,880,171 B1 | 4/2005 | Ahmad et al. |
| 6,895,086 B2 | 5/2005 | Martin |
| 6,898,612 B1 | 5/2005 | Parra et al. |
| 6,907,387 B1 | 6/2005 | Reardon |
| 6,920,209 B1 | 7/2005 | Gainsboro |
| 6,947,525 B2 | 9/2005 | Benco |
| 6,970,554 B1 | 11/2005 | Peterson et al. |
| 7,032,007 B2 | 4/2006 | Fellenstein et al. |
| 7,035,386 B1 | 4/2006 | Susen et al. |
| 7,039,171 B2 | 5/2006 | Gickler |
| 7,039,585 B2 | 5/2006 | Wilmot et al. |
| 7,046,779 B2 | 5/2006 | Hesse |
| 7,050,918 B2 | 5/2006 | Pupalaikis et al. |
| 7,062,286 B2 | 6/2006 | Grivas et al. |
| 7,075,919 B1 | 7/2006 | Wendt et al. |
| 7,079,636 B1 | 7/2006 | McNitt et al. |
| 7,079,637 B1 | 7/2006 | McNitt et al. |
| 7,092,494 B1 | 8/2006 | Anders et al. |
| 7,103,549 B2 | 9/2006 | Bennett et al. |
| 7,106,843 B1 | 9/2006 | Gainsboro et al. |
| 7,123,704 B2 | 10/2006 | Martin |
| 7,133,511 B2 | 11/2006 | Buntin et al. |
| 7,133,828 B2 | 11/2006 | Scarano et al. |
| 7,133,845 B1 | 11/2006 | Ginter et al. |
| 7,149,788 B1 | 12/2006 | Gundla et al. |
| 7,191,133 B1 * | 3/2007 | Pettay ............... G06Q 10/06398 |
| | | 379/265.06 |
| 7,197,560 B2 | 3/2007 | Caslin et al. |
| 7,236,932 B1 | 6/2007 | Grajski |
| 7,248,685 B1 | 7/2007 | Martin |
| 7,256,816 B2 | 8/2007 | Profanchik et al. |
| 7,277,468 B2 | 10/2007 | Tian et al. |
| 7,280,816 B2 | 10/2007 | Fratti et al. |
| 7,324,637 B2 | 1/2008 | Brown et al. |
| 7,333,798 B2 | 2/2008 | Hodge |
| 7,366,782 B2 | 4/2008 | Chong et al. |
| 7,406,039 B2 | 7/2008 | Cherian et al. |
| 7,417,983 B2 | 8/2008 | He et al. |
| 7,424,715 B1 | 9/2008 | Dutton |
| 7,466,816 B2 | 12/2008 | Blair |
| 7,494,061 B2 | 2/2009 | Reinhold |
| 7,496,345 B1 | 2/2009 | Rae et al. |
| 7,505,406 B1 | 3/2009 | Spadaro et al. |
| 7,519,169 B1 | 4/2009 | Hingoranee et al. |
| 7,529,357 B1 * | 5/2009 | Rae .................. H04M 3/38 |
| | | 379/189 |
| 7,551,732 B2 | 6/2009 | Anders |
| 7,596,498 B2 | 9/2009 | Basu et al. |
| 7,617,445 B1 * | 11/2009 | Townsend ............. G06F 40/169 |
| | | 715/201 |
| 7,627,477 B2 | 12/2009 | Wang |
| 7,639,791 B2 | 12/2009 | Hodge |
| 7,664,243 B2 | 2/2010 | Martin |
| 7,672,845 B2 | 3/2010 | Beranek et al. |
| RE41,190 E | 4/2010 | Darling |
| 7,698,182 B2 | 4/2010 | Falcone et al. |
| 7,742,581 B2 | 6/2010 | Hodge et al. |
| 7,742,582 B2 | 6/2010 | Harper |
| 7,783,021 B2 | 8/2010 | Hodge |
| 7,804,941 B2 | 9/2010 | Keiser et al. |
| 7,805,457 B1 * | 9/2010 | Viola ................. G06Q 50/26 |
| | | 707/E17.135 |
| 7,826,604 B2 | 12/2010 | Martin |
| 7,848,510 B2 | 12/2010 | Shaffer et al. |
| 7,853,243 B2 | 12/2010 | Hodge |
| 7,860,222 B1 * | 12/2010 | Sidler ................. H04L 63/302 |
| | | 379/85 |
| 7,881,446 B1 | 2/2011 | Apple et al. |
| 7,899,167 B1 * | 3/2011 | Rae .................. H04M 7/006 |
| | | 379/189 |
| 7,961,860 B1 | 6/2011 | McFarlen |
| 7,973,043 B2 | 7/2011 | Migaly |
| 8,031,052 B2 | 10/2011 | Polozola |
| 8,098,804 B1 * | 1/2012 | Rae .................. H04M 17/10 |
| | | 379/88.19 |
| 8,099,080 B1 | 1/2012 | Rae et al. |
| 8,135,115 B1 | 3/2012 | Hogg, Jr. et al. |
| 8,204,177 B2 | 6/2012 | Harper |
| 8,295,446 B1 | 10/2012 | Apple et al. |
| 8,340,260 B1 * | 12/2012 | Rae .................. H04M 3/38 |
| | | 709/212 |
| 8,458,732 B2 | 6/2013 | Hanna et al. |
| 8,467,381 B1 | 6/2013 | Keiser et al. |
| 8,488,756 B2 | 7/2013 | Hodge et al. |
| 8,498,937 B1 | 7/2013 | Shipman, Jr. et al. |
| 8,509,390 B2 | 8/2013 | Harper |
| 8,542,802 B2 * | 9/2013 | Olligschlaeger .... H04M 3/2281 |
| | | 379/88.01 |
| 8,577,003 B2 | 11/2013 | Rae |
| 8,630,726 B2 | 1/2014 | Hodge et al. |
| 8,731,934 B2 | 5/2014 | Olligschlaeger et al. |
| 8,756,065 B2 | 6/2014 | Melamed et al. |
| 8,806,020 B1 | 8/2014 | Lewis et al. |
| 8,886,663 B2 | 11/2014 | Gainsboro et al. |
| 8,917,848 B2 | 12/2014 | Torgersrud et al. |
| 8,929,525 B1 | 1/2015 | Edwards |
| 9,020,115 B2 | 4/2015 | Hangsleben |
| 9,043,813 B2 | 5/2015 | Hanna et al. |
| 9,077,680 B2 | 7/2015 | Harper |
| 9,094,500 B1 | 7/2015 | Edwards |
| 9,143,609 B2 | 9/2015 | Hodge |
| 9,232,051 B2 | 1/2016 | Torgersrud et al. |
| 9,307,386 B2 | 4/2016 | Hodge et al. |
| 9,396,320 B2 | 7/2016 | Lindemann |
| 9,552,417 B2 | 1/2017 | Olligschlaeger et al. |
| 9,609,121 B1 * | 3/2017 | Hodge ............... H04N 7/141 |
| 9,615,060 B1 | 4/2017 | Hodge |
| 9,621,504 B2 | 4/2017 | Torgersrud et al. |
| 9,674,340 B1 * | 6/2017 | Hodge ............... H04N 7/141 |
| 9,800,830 B2 | 10/2017 | Humphries |
| 9,923,936 B2 | 3/2018 | Hodge |
| 10,129,392 B1 | 11/2018 | Hodge |
| 10,133,621 B1 | 11/2018 | Skiff et al. |
| 10,572,961 B2 | 2/2020 | Hodge |
| 10,628,571 B2 | 4/2020 | Kursun et al. |
| 10,672,383 B1 | 6/2020 | Thomson et al. |
| 10,686,935 B1 | 6/2020 | Parampottil et al. |
| 10,860,786 B2 | 12/2020 | Hodge |
| 2001/0009547 A1 | 7/2001 | Jinzaki et al. |

(56) References Cited

U.S. PATENT DOCUMENTS

| | | |
|---|---|---|
| 2001/0036821 A1 | 11/2001 | Gainsboro et al. |
| 2001/0043697 A1 | 11/2001 | Cox et al. |
| 2001/0056349 A1 | 12/2001 | St. John |
| 2001/0056461 A1 | 12/2001 | Kampe et al. |
| 2002/0002464 A1 | 1/2002 | Pertrushin |
| 2002/0010587 A1 | 1/2002 | Pertrushin |
| 2002/0032566 A1 | 3/2002 | Tzirkel-Hancock et al. |
| 2002/0046057 A1 | 4/2002 | Ross |
| 2002/0067272 A1 | 6/2002 | Lemelson et al. |
| 2002/0069084 A1 | 6/2002 | Donovan |
| 2002/0076014 A1 | 6/2002 | Holtzberg |
| 2002/0107871 A1 | 8/2002 | Wyzga et al. |
| 2002/0124018 A1 | 9/2002 | Fifield et al. |
| 2002/0129057 A1* | 9/2002 | Spielberg ................ G10L 15/26 715/201 |
| 2002/0147707 A1 | 10/2002 | Kraay et al. |
| 2002/0174183 A1 | 11/2002 | Saeidi |
| 2003/0002639 A1 | 1/2003 | Huie |
| 2003/0023444 A1 | 1/2003 | St. John |
| 2003/0023874 A1 | 1/2003 | Prokupets et al. |
| 2003/0035514 A1 | 2/2003 | Jang |
| 2003/0040326 A1 | 2/2003 | Levy et al. |
| 2003/0070076 A1 | 4/2003 | Michael |
| 2003/0086546 A1 | 5/2003 | Falcone et al. |
| 2003/0093533 A1 | 5/2003 | Ezerzer et al. |
| 2003/0099337 A1 | 5/2003 | Lord |
| 2003/0117280 A1 | 6/2003 | Prehn |
| 2003/0126470 A1 | 7/2003 | Crites et al. |
| 2003/0154072 A1 | 8/2003 | Young et al. |
| 2003/0174826 A1 | 9/2003 | Hesse |
| 2003/0190045 A1 | 10/2003 | Huberman et al. |
| 2004/0008828 A1 | 1/2004 | Coles et al. |
| 2004/0029564 A1 | 2/2004 | Hodge |
| 2004/0081296 A1 | 4/2004 | Brown et al. |
| 2004/0090962 A1 | 5/2004 | Forest et al. |
| 2004/0114740 A1 | 6/2004 | Gickler |
| 2004/0117185 A1 | 6/2004 | Scarano et al. |
| 2004/0161086 A1 | 8/2004 | Buntin et al. |
| 2004/0169683 A1 | 9/2004 | Chiu et al. |
| 2004/0249650 A1 | 12/2004 | Freedman et al. |
| 2004/0252184 A1 | 12/2004 | Hesse et al. |
| 2004/0252447 A1 | 12/2004 | Hesse et al. |
| 2005/0010411 A1 | 1/2005 | Rigazio et al. |
| 2005/0027723 A1 | 2/2005 | Jones et al. |
| 2005/0078006 A1 | 4/2005 | Hutchins et al. |
| 2005/0080625 A1 | 4/2005 | Bennett et al. |
| 2005/0094794 A1 | 5/2005 | Creamer et al. |
| 2005/0102371 A1 | 5/2005 | Aksu |
| 2005/0114192 A1 | 5/2005 | Tor et al. |
| 2005/0125226 A1 | 6/2005 | Magee |
| 2005/0128283 A1 | 6/2005 | Bulriss et al. |
| 2005/0141565 A1 | 6/2005 | Forest et al. |
| 2005/0141678 A1 | 6/2005 | Anders et al. |
| 2005/0144004 A1 | 6/2005 | Bennett et al. |
| 2005/0170818 A1 | 8/2005 | Netanel et al. |
| 2005/0182628 A1 | 8/2005 | Choi |
| 2005/0207357 A1 | 9/2005 | Koga |
| 2005/0256746 A1 | 11/2005 | Zaleski |
| 2006/0064037 A1 | 3/2006 | Shalon et al. |
| 2006/0087554 A1 | 4/2006 | Boyd et al. |
| 2006/0087555 A1 | 4/2006 | Boyd et al. |
| 2006/0093099 A1 | 5/2006 | Cho |
| 2006/0143559 A1* | 6/2006 | Spielberg ................ H04L 67/10 715/201 |
| 2006/0161838 A1* | 7/2006 | Nydam ................ G06F 40/169 715/201 |
| 2006/0179403 A1 | 8/2006 | Kirkpatrick |
| 2006/0198504 A1 | 9/2006 | Shemisa et al. |
| 2006/0200353 A1 | 9/2006 | Bennett |
| 2006/0239296 A1 | 10/2006 | Jinzaki et al. |
| 2006/0285650 A1 | 12/2006 | Hodge |
| 2006/0285665 A1 | 12/2006 | Wasserblat et al. |
| 2007/0003026 A1 | 1/2007 | Hodge et al. |
| 2007/0011008 A1 | 1/2007 | Scarano et al. |
| 2007/0041545 A1 | 2/2007 | Gainsboro |
| 2007/0047734 A1 | 3/2007 | Frost |
| 2007/0071206 A1 | 3/2007 | Gainsboro et al. |
| 2007/0133437 A1 | 6/2007 | Wengrovitz et al. |
| 2007/0185717 A1 | 8/2007 | Bennett |
| 2007/0192174 A1 | 8/2007 | Bischoff |
| 2007/0195703 A1 | 8/2007 | Boyajian et al. |
| 2007/0237099 A1 | 10/2007 | He et al. |
| 2007/0244690 A1 | 10/2007 | Peters |
| 2007/0266304 A1* | 11/2007 | Fletcher ................ G06F 40/169 715/230 |
| 2008/0000966 A1 | 1/2008 | Keiser |
| 2008/0021708 A1 | 1/2008 | Bennett et al. |
| 2008/0046241 A1 | 2/2008 | Osburn et al. |
| 2008/0096178 A1 | 4/2008 | Rogers et al. |
| 2008/0106370 A1 | 5/2008 | Perez et al. |
| 2008/0118045 A1 | 5/2008 | Polozola et al. |
| 2008/0195387 A1 | 8/2008 | Zigel et al. |
| 2008/0198978 A1* | 8/2008 | Olligschlaeger .. H04M 3/42221 379/189 |
| 2008/0201143 A1* | 8/2008 | Olligschlaeger ...... G06F 16/283 704/235 |
| 2008/0201158 A1 | 8/2008 | Johnson et al. |
| 2008/0209303 A1 | 8/2008 | Leung et al. |
| 2008/0260133 A1 | 10/2008 | Hodge et al. |
| 2008/0300878 A1 | 12/2008 | Bennett |
| 2009/0030682 A1 | 1/2009 | VanSickle et al. |
| 2009/0178144 A1 | 7/2009 | Redlich et al. |
| 2009/0204843 A1 | 8/2009 | Celinski et al. |
| 2009/0306981 A1 | 12/2009 | Cromack et al. |
| 2010/0100479 A1* | 4/2010 | Rosenfield ............ G06Q 20/10 379/201.01 |
| 2010/0177881 A1 | 7/2010 | Hodge |
| 2010/0202595 A1 | 8/2010 | Hodge et al. |
| 2010/0215057 A1 | 8/2010 | Frink et al. |
| 2010/0299761 A1 | 11/2010 | Shapiro |
| 2011/0055256 A1 | 3/2011 | Phillips et al. |
| 2011/0206038 A1 | 8/2011 | Hodge |
| 2011/0244440 A1 | 10/2011 | Saxon et al. |
| 2011/0260870 A1 | 10/2011 | Bailey |
| 2011/0261941 A1 | 10/2011 | Walters et al. |
| 2011/0279228 A1 | 11/2011 | Kumar et al. |
| 2012/0041911 A1 | 2/2012 | Pestian et al. |
| 2012/0059760 A1* | 3/2012 | Rosenfield ........... G06Q 20/108 705/39 |
| 2012/0099716 A1* | 4/2012 | Rae ...................... H04M 17/204 379/188 |
| 2012/0166924 A1 | 6/2012 | Larson et al. |
| 2012/0262271 A1 | 10/2012 | Torgersrud et al. |
| 2013/0013991 A1 | 1/2013 | Evans |
| 2013/0104246 A1 | 4/2013 | Bear et al. |
| 2013/0124192 A1 | 5/2013 | Lindmark et al. |
| 2013/0179949 A1 | 7/2013 | Shapiro |
| 2013/0263227 A1 | 10/2013 | Gongaware et al. |
| 2013/0279686 A1 | 10/2013 | Keiser et al. |
| 2013/0336469 A1 | 12/2013 | Olligschlaeger |
| 2014/0013008 A1* | 1/2014 | Lazarus ................. H04L 69/28 709/248 |
| 2014/0222780 A1* | 8/2014 | Wu ...................... G06F 16/2428 707/722 |
| 2014/0247926 A1 | 9/2014 | Gainsboro et al. |
| 2014/0254777 A1* | 9/2014 | Olligschlaeger ...... G06F 16/686 379/88.01 |
| 2014/0273929 A1 | 9/2014 | Torgersrud |
| 2014/0280559 A1 | 9/2014 | Torgersrud |
| 2014/0287715 A1 | 9/2014 | Hodge et al. |
| 2014/0313275 A1 | 10/2014 | Gupta et al. |
| 2014/0334610 A1 | 11/2014 | Hangsleben |
| 2015/0051893 A1 | 2/2015 | Ratcliffe, III et al. |
| 2015/0077245 A1 | 3/2015 | Kaufman et al. |
| 2015/0206417 A1 | 7/2015 | Bush |
| 2015/0215254 A1 | 7/2015 | Bennett |
| 2015/0221151 A1 | 8/2015 | Bacco et al. |
| 2015/0281431 A1 | 10/2015 | Gainsboro et al. |
| 2015/0281433 A1 | 10/2015 | Gainsboro et al. |
| 2015/0332186 A1 | 11/2015 | Torgersrud |
| 2015/0339370 A1 | 11/2015 | Onusko et al. |
| 2015/0339787 A1 | 11/2015 | Evans |
| 2016/0191484 A1 | 6/2016 | Gongaware |

(56) References Cited

U.S. PATENT DOCUMENTS

| | | | |
|---|---|---|---|
| 2016/0224538 A1 | 8/2016 | Chandrasekar et al. | |
| 2016/0239932 A1* | 8/2016 | Sidler | H04L 12/1827 |
| 2016/0277302 A1 | 9/2016 | Olsen | |
| 2016/0301728 A1 | 10/2016 | Keiser et al. | |
| 2016/0371756 A1 | 12/2016 | Yokel et al. | |
| 2016/0373909 A1 | 12/2016 | Rasmussen et al. | |
| 2017/0034355 A1 | 2/2017 | Kamat et al. | |
| 2017/0062010 A1* | 3/2017 | Pappu | G11B 27/105 |
| 2017/0147662 A1* | 5/2017 | Olligschlaeger | G06F 16/685 |
| 2017/0270115 A1 | 9/2017 | Cormack et al. | |
| 2017/0270627 A1 | 9/2017 | Hodge | |
| 2017/0295212 A1* | 10/2017 | Hodge | H04L 65/1083 |
| 2017/0323410 A1 | 11/2017 | Donovan | |
| 2018/0167421 A1 | 6/2018 | Hodge | |
| 2018/0227625 A1 | 8/2018 | Yoshizawa et al. | |
| 2018/0278464 A1 | 9/2018 | Donovan et al. | |
| 2018/0293682 A1 | 10/2018 | Hodge | |
| 2018/0349335 A1* | 12/2018 | Hodge | H04L 67/535 |
| 2019/0163891 A1 | 5/2019 | Kursun et al. | |
| 2020/0242716 A1 | 7/2020 | Hodge | |
| 2020/0314157 A1 | 10/2020 | Hodge | |
| 2021/0157976 A1 | 5/2021 | Hodge | |
| 2021/0252914 A1* | 8/2021 | Kim | B60C 7/14 |

FOREIGN PATENT DOCUMENTS

| | | | |
|---|---|---|---|
| GB | 2075313 | 11/1981 | |
| JP | 59225626 | 12/1984 | |
| JP | 60010821 | 1/1985 | |
| JP | 61135239 | 6/1986 | |
| JP | 3065826 | 3/1991 | |
| WO | WO 96/14703 A1 | 11/1995 | |
| WO | WO 98/13993 A1 | 4/1998 | |
| WO | WO 2001/074042 A2 | 10/2001 | |
| WO | WO-2005062197 A1 * | 7/2005 | G06F 17/241 |
| WO | WO 2016/028864 A1 | 2/2016 | |
| WO | WO-2016068852 A1 * | 5/2016 | G06F 17/30539 |

OTHER PUBLICATIONS

"Cisco IAD2420 Series Integrated Access Devices Software Configuration Guide—Initial Configuration," Cisco Systems, accessed Sep. 23, 2014, accessible at http://www.cisco.com/en/us/docs/routers/access/2400/2420/software/configuration/guide/init_cf.html; 5 pages.
"Hong Kong: Prison Conditions in 1997," Human Rights Watch, Mar. 1, 1997, C905, available at http://www.refworld.org/docid/3ae6a7d014.html, accessed May 29, 2014; 48 pages.
"PacketCable™ 1.0 Architecture Framework Technical Report", PKT-TR-ARCH-V01-001201 (Cable Television Laboratories, Inc. 1999).
"PacketCable™ Audio/Video Codecs Specification," Cable Television Laboratories, Inc., Ser. No. PKT-SP-CODEC-I05-040113 (2004).
"Service-Observing Arrangements Using Key Equipment for Telephone Company Business Offices, Description and Use," Pac. Tel. & Tel. Co., Bell System Practices, Station Operations Manual, Section C71.090, Issue A, 1-1-57-N, 1957; 8 pages.
"SIP and IPLink™ in the Next Generation Network: An Overview," Intel, 2001; 6 pages.
"The AutoEDMS Document Management and Workflow System: An Overview of Key Features, Functions and Capabilities," ACS Software, May 2003; 32 pages.
"Voice Over Packet in Next Generation Networks: An Architectural Framework," Bellcore, Special Report SR-4717, Issue 1, Jan. 1999; 288 pages.
"Cool Edit Pro, Version 1.2 User Guide," Syntrillium Software Corporation, 1998; 226 pages.
"Criminal Calls: A Review of the Bureau of Prisons' Management of Inmate Telephone Privileges," U.S. Department of Justice, Office of the Inspector General, Aug. 1999; 166 pages.
"Global Call API for Linux and Windows Operating Systems," Intel Dialogic Library Reference, Dec. 2005; 484 pages.
"The NIST Year 2002 Speaker Recognition Evaluation Plan," NIST, Feb. 27, 2002, accessible at http://www.itl.nist.gov/iad/mig/tests/spk/2002/2002-spkrecevalplan-v60.pdf; 9 pages.
Aggarwal, et al., "An Environment for Studying Switching System Software Architecture," IEEE, Global Telecommunications Conference, 1988; 7 pages.
Auckenthaler, et al., "Speaker-Centric Score Normalization and Time Pattern Analysis for Continuous Speaker Verification," International Conference on Acoustics, Speech, and Signal Processing (ICASSP), vol. 2, Jun. 2000, pp. 1065-1068.
Audacity Team, "About Audacity," World Wide Web, 2014, accessible at http://wiki.audacity.team.org/wiki/About_Audacity; 3 pages.
Beek et al., "An Assessment of the Technology of Automatic Speech Recognition for Military Applications," IEEE Trans. Acoustics, Speech, and Signal Processing, vol. ASSP-25, No. 4, 1977; pp. 310-322.
Beigi, et al., "A Hierarchical Approach to Large-Scale Speaker Recognition," EuroSpeech 1999, Sep. 1999, vol. 5; pp. 2203-2206.
Beigi, et al., "IBM Model-Based and Frame-by-Frame Speaker-Recognition," Speaker Recognition and its Commercial and Forensic Applications, Apr. 1998; pp. 1-4.
Beigi, H., "Challenges of Large-Scale Speaker Recognition," 3rd European Cooperation in the Field of Scientific and Technical Research Conference, Nov. 4, 2005; 33 pages.
Beigi, H., "Decision Theory," Fundamentals of Speaker Recognition, Ch. 9, Springer, US 2011; pp. 313-339.
Bender, et al., "Techniques for Data Hiding," IBM Systems Journal, vol. 35, Nos. 3&4, 1996; 24 pages.
Boersma, et al., "Praat: Doing Phonetics by computer," World Wide Web, 2015, accessible at http://www.fon.hum.uva.nl/praat; 2 pages.
Bolton, et al., "Statistical Fraud Detection: A Review," Statistical Science, vol. 17, No. 3 (2002), pp. 235-255.
Boney, L., et al., "Digital Watermarks for Audio Signals" Proceedings of EUSIPC0-96, Eighth European Signal processing Conference, Trieste, Italy, 10-13 (1996).
Boney, L., et al., "Digital Watermarks for Audio Signals" Proceedings of the International Conference on Multimedia Computing Systems, p. 473-480, IEEE Computer Society Press, United States (1996).
Bur Goode, Voice Over Internet Protocol (VoIP), Proceedings of the IEEE, vol. 90, No. 9, Sep. 2002; pp. 1495-1517.
Carey, et al., "User Validation for Mobile Telephones," International Conference on Acoustics, Speech, and Signal Processing (ICASSP), vol. 2, Jun. 2000, pp. 1093-1096.
Chau, et al., "Building an Infrastructure for Law Enforcement Information Sharing and Collaboration: Design Issues and Challenges," National Conference on Digital Government, 2001; 6 pages.
Chaudhari, et al., "Transformation enhanced multi-grained modeling for text-independent speaker recognition," International Conference on Spoken Language Processing, 2000, pp. 298-301.
Christel, et al., "Interactive Maps for a Digital Video Library," IEEE Special Edition on Multimedia Computing, Jan.-Mar. 2000, IEEE, United States; pp. 60-67.
Clavel, et al., "Events Detection for an Audio-Based Surveillance System," IEEE International Conference on Multimedia and Expo (ICME2005), Jul. 6-8, 2005, pp. 1306-1309.
Coden, et al., "Speech Transcript Analysis for Automatic Search," Proceedings of the 34th Hawaii International Conference on System Sciences, IEEE, 2001; 9 pages.
Coherent Announces Industry's First Remote Management System for Echo Canceller, Business Wire, Mar. 3, 1997; 3 pages.
Corbato, et al., "Introduction and Overview of the MULTICS System," Proceedings—Fall Joint Computer Conference, 1965; 12 pages.
Cox, et al.; "Secure Spread Spectrum Watermarking for Multimedia," NEC Research Institute, Technical Report 95-10, Dec. 1997; 34 pages.
"Bellcore Notes on the Networks," Bellcore, Special Report SR-2275, Issue 3, Dec. 1997.
Doddington, G., "Speaker Recognition based on Idiolectal Differences between Speakers," 7th European Conference on Speech Communication and Technology, Sep. 3-7, 2001; 4 pages.

(56) References Cited

OTHER PUBLICATIONS

Dunn, et al., "Approaches to speaker detection and tracking in conversational speech," Digital Signal Processing, vol. 10, 2000; pp. 92-112.
Dye, Charles, "Oracle Distributed Systems," O'Reilly Media, Inc., Apr. 1, 1999; 29 pages.
Fischer, Alan D., "COPLINK nabs criminals faster," Arizona Daily Star, Jan. 7, 2001; 5 pages.
Fleischman, E., "Advanced Streaming Format (ASF) Specification," Microsoft Corporation, Jan. 9, 1998; 78 pages.
Fox, B., "The First Amendment Rights of Prisoners," 63 J. Crim. L. Criminology & Police Sci. 162, 1972; 24 pages.
Frankel, E., Audioconferencing Options (Teleconferencing Units, Conference Bridges and Service Bureaus), Teleconnect, vol. 4, No. 5, p. 131(3), May 1996; 6 pages.
Furui, et al., "Experimental studies in a new automatic speaker verification system using telephone speech," Acoustics, Speech, and Signal Processing, IEEE International Conference on ICASSP '80, vol. 5, Apr. 1980, pp. 1060-1062.
Furui, S., "50 Years of Progress in Speech and Speaker Recognition Research," ECTI Transactions on Computer and Information Technology, vol. 1, No. 2, Nov. 2005, pp. 64-74.
Hansen, et al., "Speaker recognition using phoneme-specific gmms," The Speaker and Language Recognition Workshop, May-Jun. 2004; 6 pages.
Hauck, et al., "COPLINK: A Case of Intelligent Analysis and Knowledge Management," University of Arizona, 1999; 20 pages.
Hewett, et al., Signaling System No. 7 (SS7/C7): Protocol, Architecture, and Services (Networking Technology), Cisco Press, Jun. 2005; 8 pages.
I2 Investigative Analysis Software; "Chart Reader", URL: http://www.i2.eo.uk/Products/Chart Reader. Jun. 13, 2005.
I2 Investigative Analysis Software; "i2 TextChart—Text Visualized", URL: http://www.i2.co.uk/Products/i2TextChart/. Jun. 13, 2005.
I2 Investigative Analysis Software; "iBase-lnformation Captured", URL: http://www.i2.co.uk/Products/iBase/. Jun. 13, 2005.
I2 Investigative Analysis Software; "iBridge", URL: http://www.i2.eo.uk/Products/iBridge/. Jun. 13, 2005.
I2 Investigative Analysis Software; "Pattern Tracer", URL: http://www.i2.co.uk/Products/Pattern Tracer/. Jun. 13, 2005.
I2 Investigative Analysis Software; "Prisons", URL: http://www.i2.co.uk/Solutions/Prisons/default.aso. Jun. 13, 2005.
I2 Investigative Analysis Software; "Setting International Standards for Investigative Analysis", URL: http://www.i2.co.uk/Products/index.htm. Jun. 13, 2005.
IMAGIS Technologies, Inc. "Computer Arrest and Booking System", [retrieved from http://www.imagistechnologies.com/Product/CABS.htm] (Nov. 5, 2002) 5 pages.
IMAGIS Technologies, Inc. "Integrated Justice System—Web-based Image and Data Sharing" [retrieved from http://www.imagistechnologies.com/Product/IJISFramework.htm>] (Nov. 5, 2002) 4 pages.
Inmate Telephone Services: Large Business: Voice, Oct. 2, 2001; 3 pages.
Intel® NetStructure High-Density Station Interface (HDSI) Boards Archived Webpage, Intel Corporation, 2003; 2 pages.
International Search Report and Written Opinion directed to International Application No. PCT/US2017/026570, mailed on May 8, 2017; 7 pages.
International Search Report and Written Opinion directed to International Application No. PCT/US2018/026235, mailed on Jul. 6, 2018; 6 pages.
International Search Report and Written Opinion directed to related International Application No. PCT/US2017/022169, mailed on May 29, 2017; 57 pages.
International Search Report for International Application No. PCT/US04/025029, European Patent Office, Netherlands, mailed on Mar. 14, 2006.

Isobe, et al., "A new cohort normalization using local acoustic information for speaker verification," Proceedings of the IEEE International Conference on Acoustics, Speech, and Signal Processing, vol. 2, Mar. 1999; pp. 841-844.
Juang, et al., "Automatic Speech Recognition—A Brief History of the Technology Development," Oct. 8, 2014; 24 pages.
Kinnunen, et al., "Real-Time Speaker Identification and Verification," IEEE Transactions on Audio, Speech, and Language Processing, vol. 14, No. 1, Jan. 2006, pp. 277-288.
Knox, "The Problem of Gangs and Security Threat Groups (STG's) in American Prisons Today: Recent Research Findings From the 2004 Prison Gang Survey," National Gang Crime Research Center, 2005; 67 pages.
Kozamernik, F., "Media Streaming over the Internet—an overview of delivery technologies," EBU Technical Review, Oct. 2002; 15 pages.
Lane, et al., Language Model Switching Based on Topic Detection for Dialog Speech Recognition, Proceedings of the IEEE-ICASSP, vol. 1, 2003, IEEE; pp. 616-619.
Maes, et al., "Conversational speech biometrics," E-Commerce Agents, Marketplace Solutions, Security Issues, and Supply and Demand, Springer-Verlang, London, UK, 2001, pp. 166-179.
Maes, et al., "Open Sesame! Speech, Password or Key to Secure Your Door?," Asian Conference on Computer Vision, Jan. 1998; pp. 1-3.
Matsui, et al., "Concatenated Phoneme Models for Text-Variable Speaker Recognition," International Conference on Acoustics, Speech, and Signal Processing (ICASSP), vol. 2, Apr. 1993; pp. 391-394.
McCollum, "Federal Prisoner Health Care Copayment Act of 2000," House of Representatives Report 106-851, 106th Congress 2d Session, Sep. 14, 2000; 22 pages.
Microsoft White Paper: "Integrated Justice Information Systems", retrieved from Microsoft Justice & Public Safety Solutions (Nov. 5, 2002) [http://jps.directtaps.net_vtibin/owssvr.dll?Using=Default%2ehtm]; 22 pages.
Moattar, et al., "Speech Overlap Detection using Spectral Features and its Application in Speech Indexing," 2nd International Conference on Information & Communication Technologies, 2006; pp. 1270-1274.
National Alliance of Gang Investigators Associations, 2005 National Gang Threat Assessment, 2005, Bureau of Justice Assistance, Office of Justice Programs, U.S. Department of Justice; 73 pages.
National Major Gang Taskforce, "A Study of Gangs and Security Threat Groups in America's Adult Prisons and Jails," 2002; 38 pages.
Navratil, et al., "A Speech Biometrics System With MultiGrained Speaker Modeling," 2000; 5 pages.
Navratil, et al., "Phonetic speaker recognition using maximum-likelihood binary-decision tree models," Proceedings of the IEEE International Conference on Acoustics, Speech, and Signal Processing, Apr. 6-10, 2003; 4 pages.
O'Harrow, R. "U.S. Backs Florida's New Counterterrorism Database; 'Matrix' Offers Law Agencies Faster Access to Americans' Personal Records"; The Washington Post. Washington, D.C., Aug. 6, 2003; p. A 01.
O'Harrow, R . . . "Database will make tracking suspected terrorists easier", The Dallas Morning News. Dallas, TX, Aug. 6, 2003; p. 7A.
Olligschlaeger, A. M., "Criminal Intelligence Databases and Applications," in Marilyn B. Peterson, Bob Morehouse, and Richard Wright, Intelligence 2000: Revising the Basic Elements—A Guide for Intelligence Professionals, Mar. 30, 2000 a joint publication of IALEIA and LEIU; 53 pages.
Osifchin, N., "A Telecommunications Buildings/Power Infrastructure in a New Era of Public Networking," IEEE 2000; 7 pages.
Pages from http://www.corp.att.com/history, archived by web.archive.org on Nov. 4, 2013.
Pelecanos, J. "Conversational biometrics," in Biometric Consortium Meeting, Baltimore, MD, Sep. 2006, accessible at http://www.biometrics.org/bc2006/presentations/Thu_Sep_21/Session_I/Pelecanos_Conversational_Biometrics.pdf; 14 pages.
Pollack, et al., "On the Identification of Speakers by Voice," The Journal of the Acoustical Society of America, vol. 26, No. 3, May 1954; 4 pages.

(56) References Cited

OTHER PUBLICATIONS

Prosecution History of International Patent Application No. PCT/US99/09493 by Brown et al., filed Apr. 29, 1999.
Prosecution History of U.S. Appl. No. 11/182,625, filed Jul. 15, 2005.
Rey, R.F., ed., "Engineering and Operations in the Bell System," 2nd Edition, AT&T Bell Laboratories: Murray Hill, NJ, 1983; 884 pages.
Reynolds, D., "Automatic Speaker Recognition Using Gaussian Mixture Speaker Models," The Lincoln Laboratory Journal, vol. 8, No. 2, 1995; pp. 173-192.
Rosenberg, et al., "SIP: Session Initial Protocol," Network Working Group, Standard Track, Jun. 2002; 269 pages.
Rosenberg, et al., "The Use of Cohort Normalized Scores for Speaker Verification," Speech Research Department, AT&T Bell Laboratories, 2nd International Conference on Spoken Language Processing, Oct. 12-16, 1992; 4 pages.
Ross, et al., "Multimodal Biometrics: An Overview," Proc. of 12th European Signal Processing Conference (EUSIPCO), Sep. 2004; pp. 1221-1224.
Science Dynamics, BubbleLINK Software Architecture, 2003; 10 pages.
Science Dynamics, Commander Call Control System, Rev. 1.04, 2002; 16 pages.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_main.htm (archived by web.archive.org on Oct. 12, 2000).
Shearme, et al., "An Experiment Concerning the Recognition of Voices," Language and Speech, vol. 2, No. 3, Jul./Sep. 1959; 10 pages.
Silberg, L., Digital on Call, HFN The Weekly Newspaper for the Home Furnishing Network, Mar. 17, 1997; 4 pages.
Silberschatz, et al., Operating System Concepts, Third Edition, Addison-Wesley: Reading, MA, Sep. 1991; 700 pages.
Simmons, R., "Why 2007 is Not Like 1984: A Broader Perspective on Technology's Effect on Privacy and Fourth Amendment Jurisprudence," J. Crim. L. & Criminology vol. 97, No. 2, Winter 2007; 39 pages.
Smith, M., "Corrections Turns Over a New LEAF: Correctional Agencies Receive Assistance From the Law Enforcement Analysis Facility," Corrections Today, Oct. 1, 2001; 4 pages.
Specification of U.S. Appl. No. 10/720,848, "Information Management and Movement System and Method," to Viola, et al., filed Nov. 24, 2003. (Abandoned).
State of North Carolina Department of Correction RFP #ITS-000938A, issued May 25, 2004; 8 pages.
Statement for the Record of John S. Pistole, Assistant Director, Counterterrorism Division, Federal Bureau of Investigation, Before the Senate Judiciary Committee, Subcommittee on Terrorism, Technology, and Homeland Security, Oct. 14, 2003.
Sundstrom, K., "Voice over IP: An Engineering Analysis," Master's Thesis, Department of Electrical and Computer Engineering, University of Manitoba, Sep. 1999; 140 pages.
Supplementary European Search Report for Application No. EP 17 77 9902, Munich, Germany, completed on Aug. 5, 2019; 7 pages.
Supplementary European Search Report for EP Application No. EP 04 80 9530, Munich, Germany, completed on Mar. 25, 2009.
Tanenbaum, A., *Modern Operating Systems,* Third Edition, Peason Prentice Hall: London, 2009; 552 pages.
Tirkel, A., et al.; "Image Watermarking—A Spread Spectrum Application," Sep. 22-25, 1996; 7 pages.
U.S. Appl. No. 60/607,447, "IP-based telephony system and method," to Apple, et al., filed Sep. 3, 2004; 665 pages.
Viswanathan, et al., "Multimedia Document Retrieval using Speech and Speaker Recognition," International Journal on Document Analysis and Recognition, Jun. 2000, vol. 2; pp. 1-24.
Walden, R., "Performance Trends for Analog-to-Digital Converters," IEEE Communications Magazine, Feb. 1999.
Weinstein, C., MIT, The Experimental Integrated Switched Network—A System-Level Network Test Facility, IEEE 1983; 8 pages.
Wilkinson, Reginald A., "Visiting in Prison," Prison and Jail Administration's Practices and Theory, 1999; 7 pages.
Winterdyk et al., "Managing Prison Gangs," Journal of Criminal Justice, vol. 38, 2010; pp. 730-736.
Zajic, et al., "A Cohort Methods for Score Normalization in Speaker Verification System, Acceleration of On-Line Cohort Methods," Proceedings of the 12th International Conference "Speech and Computer," Oct. 15-18, 2007; 6 pages.
Automatic Creation of Communication Channels Around Detected Events (ip.com; Year: 2018); 37 pages.

\* cited by examiner

SYSTEM AND METHOD FOR ANALYZING AND INVESTIGATING COMMUNICATION DATA FROM A CONTROLLED ENVIRONMENT

CROSS-REFERENCE TO RELATED APPLICATIONS

This application is a continuation of U.S. patent application Ser. No. 17/113,909, filed Dec. 7, 2020, which is a continuation of U.S. patent application Ser. No. 15/611,408, filed Jun. 1, 2017, now U.S. Pat. No. 10,860,786, issued Dec. 8, 2020, which are incorporated by reference herein in their entireties.

BACKGROUND

Field

This disclosure relates to a system and method for automatically and manually analyzing and investigating communication data obtained from one or more correctional facilities.

Background

In correctional environments such as prisons, there is a need to monitor communications involving inmates for security and safety reasons. In addition to monitoring the communications, there is also a need to analyze and investigate the communication data. As communications technology progresses, inmates gain access to different communication devices, such as traditional wired telephones, wireless smart phones, tablets, laptops, and wearable devices etc. The growing number of communication devices generate a large amount of communication data. Traditionally, all communication data is recorded and manually investigated. This process becomes less effective due to the larger amount of data recorded from so many different devices. As a result, it is believed that only a small portion of the recorded communication can be investigated and analyzed. It is highly desirable to complement manual investigations with automatic investigations to increase the scope of investigation and improve the efficiency of the investigation.

Besides the increasing amount of communication data, the type of the communication data is also getting more and more diverse. Different communication devices are able to generate different types of communication data with different formats, such as voice, text, photo, video, force, etc. Traditional investigation and analysis systems are usually configured to analyze one type of communication data, such as voice communication data or text communication data. Separate systems configured to analyze different types of communication data not only make the data management more challenging, but also limit the analysis and investigation to the type of the data being analyzed. It is thus beneficial to analyze and investigate different types of data with a universal system to simplify the data management and conduct comprehensive analysis by correlating information obtained from different types of data.

Further, it is desirable to keep track of all the comments and other investigation records conducted for the communication data and save all the investigation records so that the records can be easy reviewed, modified and searched.

While various aspects and alternative features are known in the field of communication monitoring and investigation, no one design has emerged that generally integrates all of the ideal features and performance characteristics as discussed herein.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
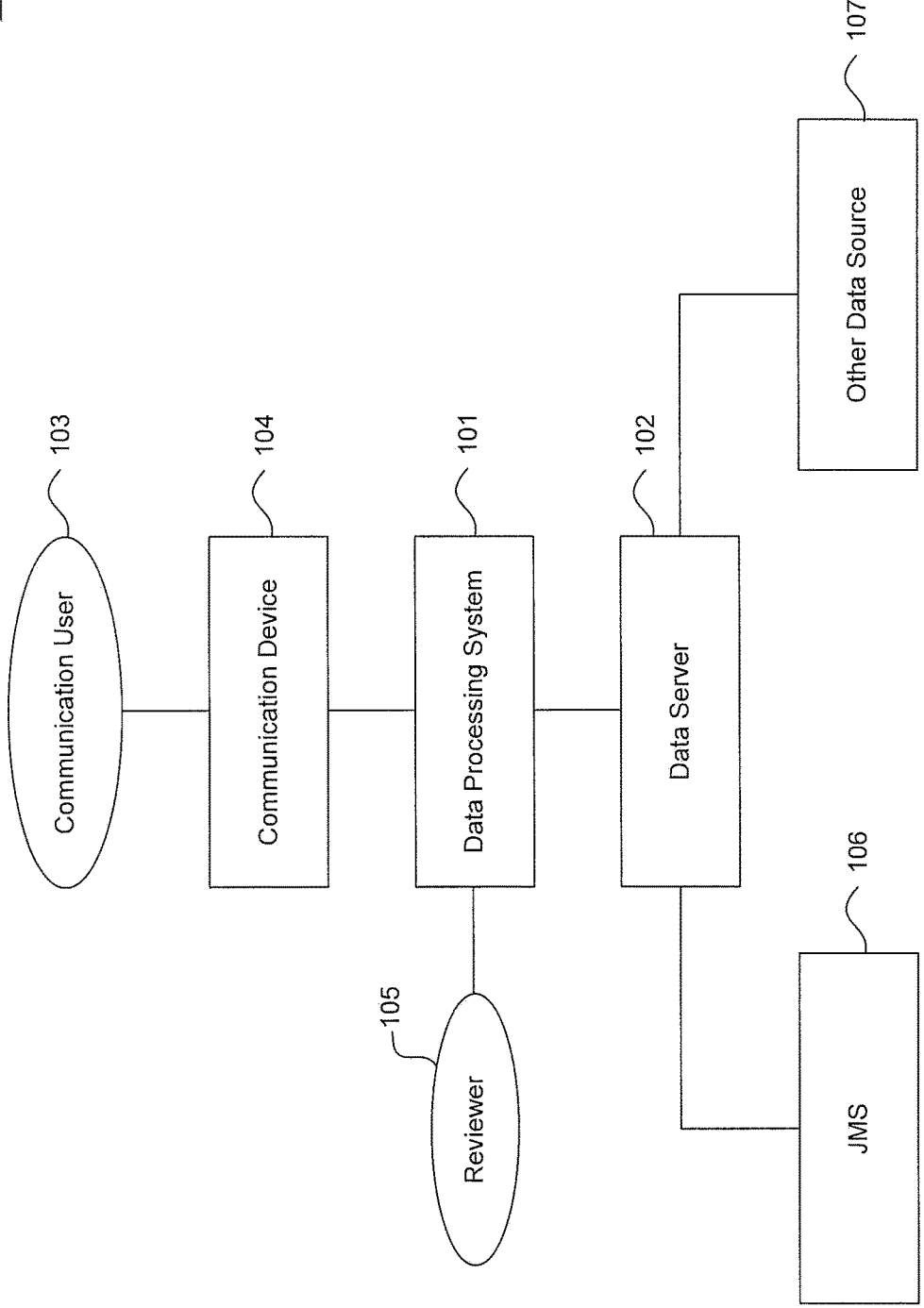
FIG. 1 illustrates a block diagram of a communication investigation and analysis scheme for controlled environments, according to some embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Advances in communications technology have opened avenues for inmates to utilize different forms of communication methods provided by an increasing number of communication devices. Maintaining the ability to monitor all the communications and analyze and investigate the communication records are becoming more and more challenging. On one hand, the amount of communication records or communication data has increased dramatically, making it impractical to investigate all the communication records conducted by the inmates. The limited amount of data being investigated not only makes it more difficult to identify potential issues within the investigated data due to a lack of information, but also make it easier to overlook important information contained in the data that is not investigated. On the other hand, the diversified data formats make data management and data analysis more challenging. For example, a voice investigation system that only analyzes voice information may have its specific voice data server, while a text investigation system may have its own text data server. Management and coordination of communication data stored in separate data servers can be difficult. Moreover, multimedia communication data containing both voice and text data may contain correlations between the voice and text data. Analyzing the voice and text data using separate analysis system can make it inconvenient to uncover the correlations between the voice and text data existed in the multimedia communication data.

In some cases, the communication data and the investigation and analysis data for the communication data may come from different data sources and data servers. For example, a data source may be an inmate telephone system in a correctional facility, and another data source may be an email system in the correctional facility. For another example, data may also come from more than one correctional facility. These data from different data sources and data servers are usually managed and stored separately, which makes the data management and data mining across different data sources more difficult and less efficient.

Further, when communication data of a communication event is conducted by a reviewer or a jurisdiction officer, the reviewer may provide review comments when he/she discovers anomalies in some portions of the communication data. It is desirable to keep a record of the comments and the locations of the portions of the communication data with anomalies, so that these comments and portions of the communication data can be easily viewed, modified and searched by other reviewers.

In light of the above, the present disclosure provides details of a system and method for investigating and analyzing communication data collected from one or more data sources. The system is configured to provide both automatic and manual investigations of communication data from different data sources. For automatic investigations, the system is configured to automatically transcribe the communication data and detect anomalies in the transcribed communication data. Whenever an anomaly is detected, the system is configured to label this anomaly in the transcribed communication data and provide specific comments for each anomaly detected. Moreover, the system can also provide investigations for both real time communication and recorded communication. Furthermore, the system is configured to keep track of all the investigation records for each reviewer who reviews the communication data, adds comments to the communication data, or modifies the existing comments associated with the communication data. The system may further be configured to allow a reviewer to search the communication data and the investigation records using pre-built or self-designed search formats.

FIG. 1 illustrates a block diagram of a communication investigation and analysis scheme 100 for controlled environments, according to some embodiments of the present disclosure. The communication investigation and analysis scheme 100 comprises a data processing system 101, a data server 102, a communication user 103, a communication device 104, a reviewer 105, a Jail Management System (JMS) 106, and an other data source 107. In some embodiments, a communication user is an inmate in a correctional facility. In some embodiments, the communication user uses a communication device 104 to conduct a communication event. The communication device 104 comprises a plurality of wired or wireless communication devices including, but not limited to, a landline telephone, a wireless phone, a wireless smart phone, a tablet, a desktop, a laptop, a speaker, a camera, and a wearable device such as a smart watch or a wrist band. A person of ordinal skills in the art would understand that there can be more than one communication user 103, and there can be more than one communication device 104. A person of ordinary skill in the art would also understand that one communication user 103 can operate more than one communication device 104, either sequentially or concurrently, to conduct communication.

In some embodiments, the communication conducted by the communication device 104 is carried out with different communication technologies including both wired and wireless communication technologies. The wired communication can be conducted through different wired networks including, but not limited to, a landline telephone network, a cable network, and a fiber-optic network. The wireless communication can be conducted with technologies including, but not limited to, GSM, 2G-5G technologies, WCDMA, CDMA, TDMA, UMTS, WIMAX, WIFI, IBEACON, Bluetooth, LTE, 700 MHz to 2200 MHz or other frequency band communication technologies. In some embodiments, the data processing system 101 is configured to receive real time communication data directly from the communication device 104 during the communication (e.g. real time detection and investigation). In some embodiments, the data processing system 101 is configured to receive wireless communication data transmitted by the communication device 104 by detecting and intercepting the communication data using an antenna and a transmitter. In some embodiments, the data processing system 101 is connected to a communication hub (e.g. a modem or a switch) that transmits data with the communication device 104 and receives the communication data from the communication hub.

In some embodiments, the data processing system 101 is configured to communicate with the data server 102 to retrieve recorded communication data stored in the data server 102. In some embodiments, the data processing system 101 connects with the data server 102 via wired connections including, but not limited to, Ethernet cables, telephone cables, and fiber-optic cables. In some other embodiments, the data processing system 101 connects with the data server 102 via wireless connections including, but not limited to, WI-FI connection, mobile technology (e.g. 1G-5G technology) connections, Bluetooth connection, radio frequency signal connections, Near Field Communication (NFC) connections, and other frequency domain technologies. In some embodiments, the communication data transmitted by the communication device 104 comprises communication data with different forms including, but not limited to, text messages, voice mails, phone calls, video recordings, video conference calls, pictures and photos, and touch force signals.

In some embodiments, the data processing system 101 is configured to handle different processing tasks in the investigation and analysis scheme 100. In some embodiments, the data processing system 101 is configured to receive communication data from the communication device 104 before further processing the data. In some embodiments, the data processing system 101 is configured to retrieve communication data from data files stored in the data server 102 before further processing the data. In some embodiments, the data processing system 101 is configured to reproduce the received communication data or the retrieved communication data. The reproduction of the communication data can include cleaning the communication data by removing blanks and data with un-recognized formats, adding synchronized clock or timing information to the communication data or synchronizing the clock or timing information in the communication data to a synchronized global clock, and sending the cleaned communication data with synchronized timing information to the data server 102 as reproduced communication data. In some embodiments, as a result of the reproduction, the communication data (e.g. voice or texts) contained in the reproduced communication data are assigned time locations (e.g. time stamps) based on the synchronized global clock. In some embodiments, the data server 102 stores the reproduced communication data into a reproduced communication file.

In some embodiments, the data processing system 101 is configured to retrieve reproduced communication data from a reproduced communication file before further processing the data. In some embodiments, the data processing system 101 recognizes the reproduced communication data and provides transcripts for the reproduced communication data by transcribing the reproduced communication data. In some embodiments, the data processing system 101 includes a speech/text recognition system that recognizes information in the reproduced communication data and translates the information into English texts. In some embodiments, the data processing system 101 can also include advanced recognition systems that are capable of recognizing and translating graphic information contained in videos and photos using one or more image recognition techniques.

In some embodiments, the data processing system 101 synchronizes the transcripts with a synchronized clock or timing information so that the information of the transcripts are associated to specific portions of the reproduced communication data based on a common synchronized clock or timing information. For example, a transcript of voice recording can include English text of words that are recognized/translated from the same words contained in the voice recording. The text of the words in the transcripts are assigned to the same time location as the words in the voice recording based on a synchronized global clock or timing information. As a result, in the transcribed communication data, the transcript is associated with the communication data according to the synchronized global clock or timing information.

In some embodiments, the data processing system 101 is configured to create metadata information for the communication data being processed by the data processing system 101. In some embodiments, the metadata information is created to enable efficient data management, investigation and analysis. The metadata information can include information of the communication user and the information of the communication event. The information of the communication user can include, for example, the name or ID of the communication user, the physical location of the communication user, the personal and criminal records of the communication user, and the biometric information of the communication user. The information of the communication event can include, for example, the communication event ID, phone numbers of the caller and the receiver, the incoming caller ID and outgoing caller ID, the communication devices involved in the communication event, the physical location of the communication devices, the time and the duration of the communication event, and the form of the communication (e.g. phone call, voice mail, text message, email, video, etc.). In some embodiments, the metadata information can further include the history of the communication data such as, for example, unprocessed or new, reproduced from certain unprocessed data, transcribed from certain reproduced data, processing errors occurred during the reproduction and the transcription processes, reviewed by a certain reviewer, commented by a certain reviewer, modified by a certain reviewer, and deleted by a certain reviewer. In some embodiments, the data processing system 101 is further configured to modify the metadata information automatically or in response to a reviewer's request.

In some embodiments, the data processing system 101 is configured to provide a synchronized global clock or timing information for the system operation. In some embodiments, the data processing system 101 obtains the synchronized global clock or timing information using a plurality of techniques such as, for example, Cristian's algorithm, Berkeley algorithm, and Network Time Protocol (NTP). With Cristian's algorithm, the data processing system 101 would issue a request to a remote time source and set the time from the remote time source as the synchronized time. With Berkeley algorithm, the data processing system 101 would obtain an average time from a number of time sources and set the synchronized time to the average time of the time sources. With the NTP, the data processing system 101 would try to synchronize with several servers, and use the best of all results to set its time. The best result is a function of a time of qualities, such as round-trip delay, consistency of the delay, round-trip error, the accuracy of the server's clock, etc.

In some embodiments, the data processing system 101 is further configured to detect anomalies in the transcribed information. In some embodiments, the detection of anomalies involves matching the information from the transcribed information to a database of pre-defined events. An anomaly is detected when a portion of the transcribed information matches information defined in one or more of the pre-defined events. For example, a text transcript for a voice mail may contain slangs. The data processing system 101 then matches the slang from the transcript with a slang in a slang database. The data processing system 101 then flags this slang in the transcript as an anomaly. In some embodiments, the detection of anomalies involves extracting topic information from the transcribed information and matching the topic information with a database of pre-defined anomaly topics. In some embodiment, the detection of the anomaly is either a supervised detection or an unsupervised detection. With a supervised detection, a set of training data is already available (e.g. provided or defined by a database) for the data processing system 101. A training data teaches the data processing system 101 to identify anomaly information from normal information. The data processing system 101 then analyzes the transcribed information and find out any anomaly based on the anomaly patterns learned from the set of training data (e.g. suspicious language pattern, offensive behavior pattern, etc.). With an unsupervised detection, a set of training data is not required, and the data processing system 101 is capable of obtaining training data from the transcribed information during the process of detection and make an implicit that normal instances are much more frequent than anomalies. The data processing system 101 can then find out anomaly if a rare language pattern emerges or a rare behavior pattern emerges. In some embodiments, the techniques of anomaly detection can include, for example, classification based anomaly detection, clustering based anomaly detection, statistical based anomaly detection, and other suitable anomaly detection techniques.

In some embodiments, the data processing system 101 is further configured to label or tag all the anomalies detected in the transcribed information for a communication event. In some embodiments, the data processing system 101 identifies the time locations (e.g. time stamps) of anomalies based on a synchronized clock or timing information. In some embodiments, the time location of an anomaly includes a beginning time of the anomaly and an end time of the anomaly. In some embodiments, an anomaly can include more than one session, and the time locations of the anomaly can include more than one beginning time and more than one end times. The data processing system 101 is further configured to save the time locations of the anomalies detected in the transcribed information into the data server 102. In some embodiments, the data processing system 101 creates a link between the time locations of all the anomalies in the transcribed information with the portions of the transcribed information, so that the data processing system 101 is able to trace the time locations of the anomalies in the transcribed information through the links between the anomalies and the transcribed information.

In some embodiments, a link is a cross reference connection used to connect different files or different portions of data from different files or from the same file. For example, a link can be a cross reference location link created between a portion of transcribed information in a transcribed communication file and a time location information stored in a separate file. With the created link, the data processing system 101 can locate the portion of the transcribed information through the time location information from the separate file, and vice versa. In some embodiments, the link can also be used to trace the changes automatically. For example, a link can be created between a portion of transcribed information in a transcribed communication file and a time location information stored in a separate file. When the portion of transcribed communication data is deleted or relocated to a new location, the time location information linked to the transcribed communication data is also deleted or modified to refer to the new location of the relocated transcribed communication data.

In some embodiments, the data processing system 101 is further configured to generate comments of the detected anomalies. In some embodiments, the comments are automatically generated based on a pre-built comments database. In some embodiments, the comments database can be a comments look-up table in which comments-anomaly pairs can be defined. In some embodiments, the data processing system 101 is further configured to add, modify, and remove comments-anomaly pairs. In some embodiments, the comments include a full description of the detected anomaly, such as the original transcribed information that triggers the anomaly detection, the nature or the pattern detected in this anomaly (e.g. slang, offensive behavior, threatening language, etc.), a confidence level of anomaly matching, a list of all communication users in this communication event, and other useful information identifiable from the transcribed information. In some embodiments, the data processing system 101 is configured to save the comments for the anomalies into the data server 102. In some embodiments, the comments for an anomaly and the time locations of the anomaly are stored in a same location in the data server 102 (e.g. a same file) so that the comments and the time locations are linked together. In some embodiments, the comments and the time locations of an anomaly are stored in separate locations and managed separately. A link can be created between the separately stored time locations and comments. In some embodiments, the comments can have their own time locations assigned to them, and the comments are not linked to an anomaly.

In some embodiments, the data processing system 101 is further configured to display the transcribed information. In some embodiments, the data processing system 101 provides a user interface to allow interfacing between a reviewer 105 and the data processing system 101. In some embodiments, the user interface is a graphical user interface (GUI). In some embodiments, the user interface further includes input and output methods, such as, for example, a keyboard, a mouse, a touch screen, a microphone, a display screen, a speaker, and other suitable input and output methods. In some embodiments, the reviewer 105 requests to view one or more portions of the transcribed information of a communication event via an input method and a user interface. The data processing system 101 receives the request and retrieves the data from the data center 102. The data processing system 101 displays the requested transcribed information to the reviewer 105 via an output method (e.g. a screen) and the user interface.

In some embodiments, the data processing system 101 further retrieves all the time locations of anomalies linked to the displayed transcribed information requested by the reviewer 105, and assign markers to each of the time locations. The data processing system 101 then display all the markers at their assigned time locations to the reviewer 105 together with the displayed transcribed information. In some embodiments, the markers can be displayed in different formats such as, for example, a notification marker at each time location for each anomaly, a highlighted box (covering a portion of text or portion of an image) for each anomaly, a colored background from each beginning time location to each end time location for each anomaly, a special format of texts from each beginning time location to each end time location for each anomaly, and other suitable forms of markers to indicate the presence of anomalies in the displayed transcribed information. In some embodiments, the data processing system is further configured to retrieves all the comments that are linked to the displayed transcribed information. Based on the time locations of the comments, or the links between the comments and the markers, the data processing system 101 displays the comments together with the displayed transcribed information at their assigned time locations. In some embodiments, the comments are directly displayed together with the displayed transcribed information (e.g. comments displayed alongside a text transcript or an image). In some embodiments, the comments are hided and only a marker is displayed at the time locations of the comments. The reviewer 105 can notice the presence of a marker indicating the existence of comments associated with the marker, and view the comments by moving the mouse over the marker. In some embodiments, the reviewer 105 can choose to display or not display the comments together with the displayed transcribed information.

In some embodiments, the data processing system 101 is further configured to provide a user interface for the reviewer 105 to interact with the transcribed information. In some embodiments, the interaction between the reviewer 105 and the data processing system 101 includes reviewing, inserting, removing, relocating, and modifying the transcribed information. In some embodiments, the interaction between the reviewer 105 and the data processing system 101 also includes reviewing, inserting, removing, relocating, and modifying the time locations of the anomalies, the markers assigned to the anomalies, and the comments that are linked to the transcribed information. In some embodiments, the reviewer inserts a marker at a specific display position in the transcribed information via the user interface. In some embodiments, the insertion of a marker is done by the user double clicking the mouse or right clicking the mouse at a specific display position (e.g. a space between two words, space between two sentences, a word, a sentence, a paragraph, a portion of a photo, etc.) in the transcribed information. The data processing system 101 receives this insertion action from the reviewer through the user interface, and identifies the time location of the inserted marker based on the synchronized clock or timing information. A link is also created by the data processing system 101 between the transcribed information and the time location of the new marker. The data processing system 101 then saves the time location of the new marker and the link between the time location and the transcribed information into the data sever 102. In some embodiments, the reviewer inserts comments at a specific display position in the transcribed information via the user interface. In some embodiments, the insertion of comments is done by the user choosing a specific display position (e.g. a space between two words, space between two sentences, a word, a sentence, a paragraph, a portion of a photo, etc.) in the transcribed information, followed by putting in comments in a comment box that pops up at the chosen position. The data processing system 101 receives this comments insertion action from the reviewer through the user interface, and identifies the time location of the inserted comments based on the synchronized clock or timing information. In some embodiments, the time location can be a specific time location for a specific display position (e.g. the time location for a space between two words), or multiple time locations beginning from a first time location (e.g. the time location of a first letter in the first word in a chosen sentence) and ending at a second time location (e.g. the time location of a last letter in the first word in a chosen sentence). A link is also created by the data processing system 101 between the transcribed information and the time location of the inserted comments. The data processing system 101 then saves the contents of the comments, the time location of the comments, and the link between the comments and the transcribed information into the data sever 102.

In some embodiments, the data processing system 101 is further configured to track the interaction records of the reviewer regarding the transcribed information. In some embodiments, the interactions of the reviewer include reviewing, inserting, removing, relocating, and modifying one or more portions of the transcribed information. In some embodiments, the interactions of the reviewer further include reviewing, inserting, removing, relocating, and modifying the time locations of the anomalies, the markers assigned to the anomalies, and the comments that are linked to the transcribed information. In some embodiments, the interaction records include the identity of the reviewer (e.g. name and/or ID of the reviewer), all the interactions conducted by the reviewer (e.g. review a portion of a transcribed information, modify a portion of the transcribed information, delete a portion of the transcribed information, etc.) and all the data generated during the interactions (e.g. the comments inserted or modified by the reviewer, the marker inserted or modified by the reviewer, the portions of the transcribed information that are modified by the reviewer, etc.). The data processing system 101 further saves the interaction records into the data server 102.

In some embodiments, the data processing system 101 is further configured to allow the reviewer to conduct an information search. In some embodiments, the reviewer can create a search request that contains search terms based on a plurality of information categories including, but not limited to transcribed information (e.g. certain words), reviewer information (e.g. a specific reviewer), anomaly information (e.g. whether an anomaly is detected and the types of anomaly), marker information (whether a marker is present and the time location of the markers), comments information (whether comments are present, whether user inserted comments are present, whether comments are modified, etc.), metadata information (e.g. whether processing error is present), and interaction records (whether reviewed by a certain reviewer). In some embodiments, the search request is created by the reviewer using a graphical user interface (GUI) provided by the data processing system 101. In some embodiments, the information search proceeds by identifying the search term, searching the data server 102 for all the information regarding the search term (e.g. all the files containing the information about the search term), compiling a list of search results, and ranking and filtering the search results (e.g. ranking and filtering the list of search results by their relevance), summarizing the search results in a search report with specific formats, and displaying the search report to the reviewer. In some embodiments, the formats of the search report is pre-defined and can be re-used. Such a search report is a canned search report. In some embodiments, the formats of the search report can be created by the reviewer. Such a search report with reviewer created formats can be an ad-hoc search report which has formats not provided in canned search reports. The reviewer can run an ad-hoc search report as an one-time search. In some embodiments, the reviewer can further save the reviewer created formats as canned search reports so that these search reports with reviewer created formats can be easily re-used by the reviewer for future information searches. In some embodiments, the formats of a search report include, but are not limited to, the selection of items to be displayed in the search reports (e.g. the name of the reviewer, the time of creation, whether the data has been reproduced, transcribed, reviewed, modified, etc.), the arrangement of displayed items in the report (e.g. the number of search results in one page, displaying search results in a top to bottom list, displaying search results in a grid view, etc.), the algorithm of ranking the search results (e.g. rank by relevance, rank by creation time, rank by number of reviewers, etc.), and the display formats of each of the search results (e.g. a summary text, a full description, a summary view, etc.). In some embodiments, the formats of a search report further include pre-defined search terms (e.g. one or more pre-defined keywords that are added to the search) and pre-defined search conditions (e.g. the data source for the search, the time range of the data to be searched, the form of data to be searched, etc).

In some embodiments, the data processing system 101 is further configured to allow the reviewer to modify the search report formats of an existing search report. In some embodiments, the reviewer can use formats from a canned report as base formats and modify the base formats. The reviewer can run an ad-hoc search based on the modified search formats or store the modified search formats as in a modified canned report so that the modified search formats can be re-used.

In some embodiments, the data processing system 101 is further configured to allow the reviewer to create scheduled search report. In some embodiments, the reviewer can create new search formats, modify existing search formats, or directly use existing search formats, to generate the search formats for the scheduled search report. In some embodiments, the reviewer can define a specific time to run the scheduled search report, a frequency or an interval of running the scheduled search report (e.g. once a day, once a week, twice a month, etc.). In some embodiments, the reviewer can define the search terms and search conditions for the search in the scheduled search report. In some embodiments, the data processing system 101 sets up the formats of the scheduled search report and sets up the scheduled search frequency or interval automatically. In some embodiments, the data processing system 101 is configured to analyze the search results of a scheduled search, and determines to narrow or widen the search terms or search conditions for the scheduled search.

In some embodiments, the data server 102 stores the communication data from a communication event received from a communication device 104. In some embodiments, the communication data is received real-time during the communication event. In some embodiments, the data server 102 directly communicates with the communication device 104. In some embodiments, the data server 102 communicates with one or more communication hub (e.g. network router, network switch, wireless signal repeater, etc.) to connect with the communication device 104. In some embodiments, the data server 102 does not directly communicate with the communication device 104. Instead, the data server 102 is configured to receive communication data from the communication device 104 by intercepting the communication data transmitted by the communication device 104. In some embodiments, the data server 102 receives data from the data processing system 101. In some embodiments, the data server 102 is further configured to communicate with and receive communication data from jurisdiction databases such as a jail management system (JMS) 106. In some embodiments, the JMS contains communication data such as a video recording for an inmate's interview with the officers of the jurisdiction. In addition, the data server 102 is configured to communicate with other data source 107, such as obtaining communication data from data servers from other security system (e.g. an independent surveillance system) or data servers from other correctional facilities. In some embodiments, the data server 102 stores the communication data received from each communication event into a communication data file and assigns a unique transaction ID for the communication data file.

In some embodiments, the communications between the data server 102 and the data processing system 101, JMS 106, and other data source 107 are carried out via wired connections including, but not limited to, Ethernet cables, telephone cables, and fiber-optic cables. In some other embodiments, the communications can also be carried out via wireless connections including, but not limited to, WI-FI connection, mobile technology (e.g. 1G-5G technology) connections, Bluetooth connection, radio frequency signal connections, Near Field Communication (NFC) connections, and other frequency domain technologies. In some embodiments, the data server 102 can be a cloud server that is not physically located in the correctional facility.

In some embodiments, the data server 102 stores the reproduced communication data, transcribed communication data, and/or metadata processed by the data processing system 101. In some embodiments, the data server 102 stores the time locations of anomalies detected in transcribed information, the markers assigned to the anomalies, the comments linked to the transcribed information, and the links created by the data processing system 101 between the transcribed information and the anomaly time locations, markers, and comments. In some embodiments, the data server 102 stores the interaction history for reviewers. In some embodiments, the data server 102 stores search formats of canned reports and ad-hoc search reports. In some embodiments, the data server 102 further stores search formats and search schedules of scheduled search reports. In some embodiments, the data server 102 further stores the search results in response to the search request created by the reviewer. In some embodiments, the communication data, the reproduced communication data, the transcribed communication data, the anomaly information (e.g. the time locations, the markers assigned to the time locations, the comments created for the anomaly, etc.) and the interaction history are stored in separate databases within the data server 102. In some embodiments, the communication data, the reproduced communication data, the transcribed communication data, the anomaly information, and the interaction history are stored in separate data files within the data server 102.

Figure 2:
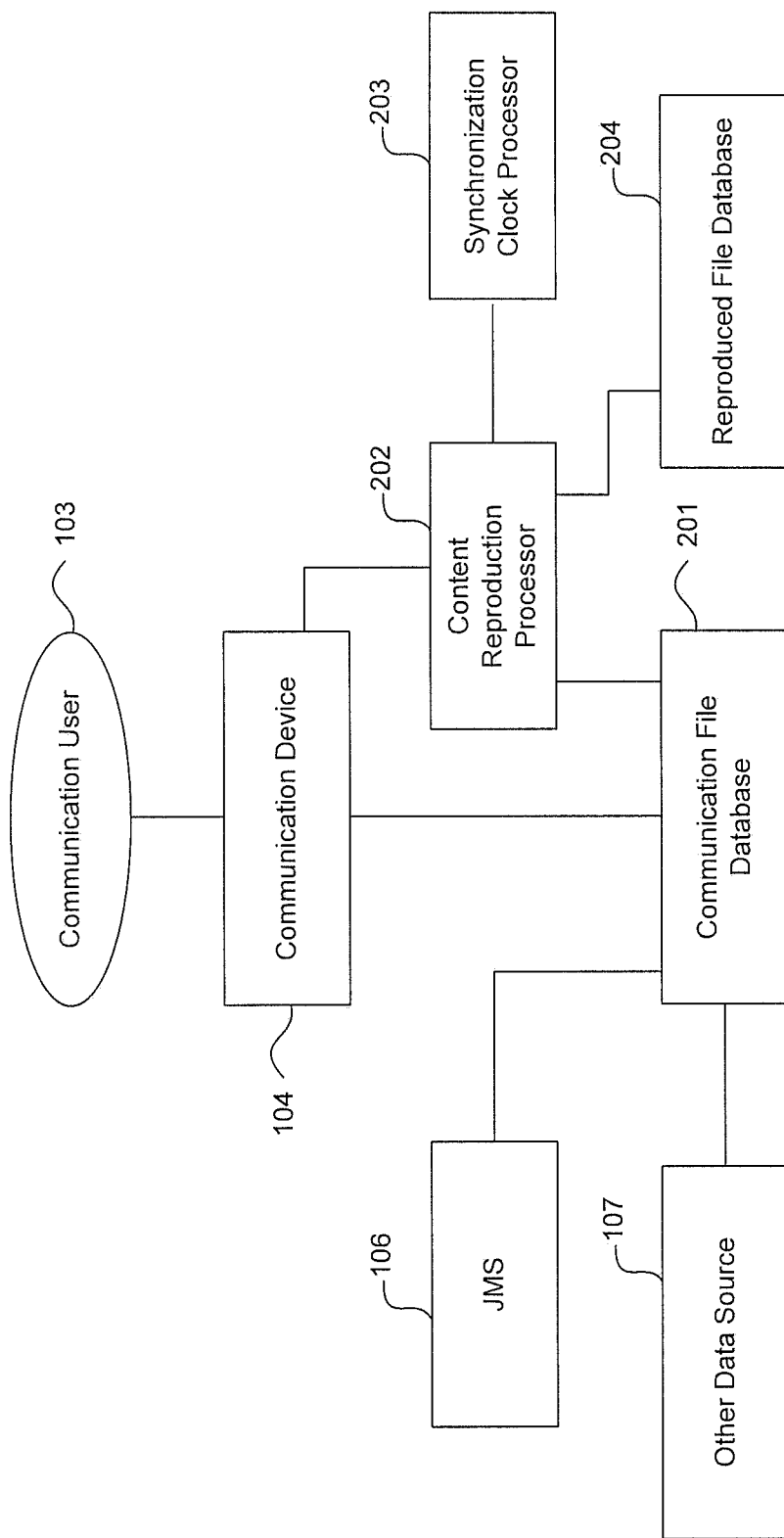
FIG. 2 illustrates a block diagram of a communication data collection and reproduction process, according to some embodiments of the present disclosure.

FIG. 2 illustrates a block diagram of a communication data collection and reproduction process 200, according to some embodiments. Referring to FIG. 2, the communication data collection and reproduction process 200 includes a communication file database 201, a content reproduction processor 202, a synchronization clock processor 203, a communication user 103, a communication device 104, JMS 106, and other data source 107. In some embodiments, the content reproduction processor 202 and the synchronization clock processor 203 are components of the data processing system 101. In some embodiments, the communication file database 201 and the reproduced file database 204 are components of the data server 102.

In some embodiments, the communication user 103 uses the communication device 104 to transmit communication data during a communication event. In some embodiments, the communication data includes different forms of data including, but not limited to, text messages, voice mails, phone calls, video recordings, video conference calls, pictures and photos, and touch force signals. In some embodiments, the communication data of this communication event is received by the communication file database 201 for data storage. In some embodiments, the communication file database 201 receives communication data from data sources such as JMS 106 and/or other data sources 107 (e.g. data servers from other security system or data servers from other correctional facilities). The communication file database 201 stores the communication data in a communication file. In some embodiments, the communication file database 201 further assigns a unique transaction ID for this communication file for data management, data indexing, and/or data searching purposes.

In some embodiments, the content reproduction processor 202 retrieves the communication data contained in the communication file stored in the communication file database 201, before further processing the communication data. In some embodiments, the content reproduction processor 202 receives real-time communication data directly from the communication device 104 during the communication event. The content reproduction processor 202 then reproduces the communication data retrieved from stored communication file database 201 or a real-time communication event. In some embodiments, the reproduction of the communication data includes cleaning the communication data by removing blanks and data with un-recognized formats. In some embodiments, the reproduction of the communication data further includes adding synchronized clock or timing information (e.g. timestamps) to the communication data, or synchronizing the existing clock or timing information in the communication data to a synchronized global clock. In some embodiments, the synchronized global clock or timing information is provided by the synchronization clock processor 203. In some embodiments, the synchronized clock or timing information is a time representation based on International standard ISO 8601 (e.g. 2017-01-01 23:59:58). In some embodiments, the synchronized clock can further include a time measured relative to the beginning of the communication data.

In some embodiments, the synchronization clock processor 203 is configured to provide a synchronized global clock or timing information for the system operation. The content reproduction processor 202 queries the synchronization clock processor 203 to obtain the synchronized clock or timing information. In some embodiments, the synchronization clock processor 203 obtains the synchronized global clock or timing information using a plurality of techniques such as, for example, Cristian's algorithm, Berkeley algorithm, and Network Time Protocol (NTP). With Cristian's algorithm, the synchronization clock processor 203 would issue a request to a remote time source and set the time from the remote time source as the synchronized time. With Berkeley algorithm, the data processing system 101 would obtain an average time from a number of time sources and set the synchronized time to the average time of the time sources. With the NTP, the synchronization clock processor 203 would try to synchronize with several servers, and use the best of all results to set its time. The best result is a function of a time of qualities, such as round-trip delay, consistency of the delay, round-trip error, the accuracy of the server's clock, etc.

In some embodiments, the content reproduction processor 202 stores the cleaned communication data with the synchronized timing information as reproduced communication data into the reproduced file database 204. In some embodiments, the reproduced communication data is stored in a reproduced communication file in the reproduced file database.

Figure 3:
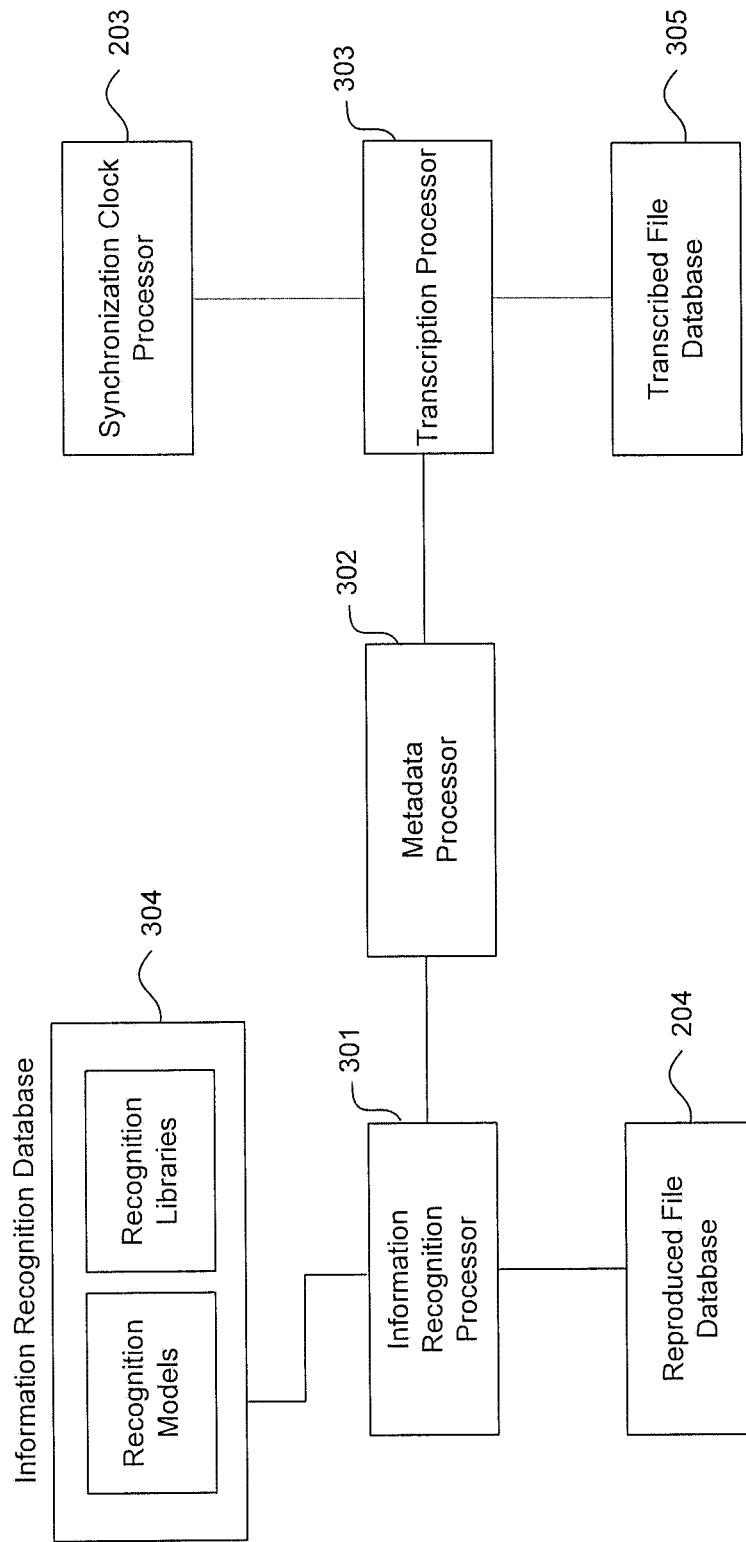
FIG. 3 illustrates a block diagram of a communication data recognition and transcription process, according to some embodiments of the present disclosure.

FIG. 3 illustrates a block diagram of a communication data recognition and transcription process 300, according to some embodiments. Referring to FIG. 3, the communication data recognition and transcription process 300 includes an information recognition processor 301, a metadata processor 302, a transcription processor 303, a synchronization clock processor 203, an information recognition database 304, a reproduced file database 204, and a transcribed file database 305. In some embodiments, the information recognition processor 301, the metadata processor 302, the transcription processor 303, and the synchronization clock processor 203 are components of the data processing system 101. In some embodiments, the information recognition database 304, the reproduced file database 204, and the transcribed file database 305 are components of the data server 102.

In some embodiments, the information recognition processor 301 is a speech recognition processor, an image recognition processor, or a combination thereof. In some embodiments, a speech recognition processor is configured to retrieve the audio information (e.g. the raw audio waveforms) from communication data (e.g. a voice mail, a phone call, a video conference call, etc.) and convert the audio information into a text format (e.g. an English text format). In some embodiments, an image recognition processor is configured to identify useful information from communication data that contains image information (e.g. a photo, a video conference, a video recording, etc.). In some embodiments, the useful information that can be identified by an image recognition processor includes, but is not limited to, an object, a weapon, a person, a building, a place, a gang logo, a hand gesture, an aggressive facial expression, a word or other text information in an image, or anything else that helps in determining potential anomalies in the communication. In some embodiments, the information recognition processor 301 queries the recognition models in the information recognition database 304 to obtain recognition models for the recognition process. In some embodiments, the recognition models include, but are not limited to, hidden Markov models, neural networks based models, fuzzy models, and other suitable speech recognition and image recognition models.

In some embodiments, the information recognition processor 301 further queries the language libraries in the information recognition database 304 to properly translate the speech information and the image information recognized in the recognition process. The language libraries host information including, but not limited to, language models, vocabularies, grammars, blacklist object databases, facial expression databases, In one embodiment, the information recognition processor 301 recognizes a different language from English in a voice recording. The information recognition processor 301 queries the recognition libraries for the vocabulary and grammar models of the different language to translate the recognized language into reviewer understandable English. In another embodiment, the information recognition processor 301 recognizes a knife in a video recording. The recognition processor 301 queries the recognition libraries for the list of objects that are not allowed by the jurisdiction (e.g. blacklist objects) and identifies the knife as one of the blacklist objects. The recognition processor 301 then transforms this information into a reviewer understandable text format (e.g. "blacklist object-a knife").

In some embodiments, the information recognition processor 301 is further configured to generate error information during the recognition process. The error information is used to gauge the quality of the recognition process. In one embodiment, the information recognition processor 301 successfully recognizes a major portion of a voice recordings but fails to recognize a small portion of the voice recording. The information recognition processor generates error information with regard to the portion of the voice recording that fails the recognition. The information processor further calculates a quality factor for the recognition based on a pre-defined algorithm (e.g. a ratio in time duration between the failed portion to the whole voice recording).

In some embodiments, the metadata processor 302 is configured to create metadata information for the communication data being processed by the data processing system 101. In some embodiments, the metadata information is created to enable efficient data management, investigation and analysis. The metadata information can include information of the communication user and the information of the communication event. The information of the communication user can include, but is not limited to, the name or ID of the communication user, the physical location of the communication user, the personal and criminal records of the communication user, and the biometric information of the communication user. The information of the communication event can include, for example, the communication event ID, phone numbers of the caller and the receiver, the incoming caller ID and outgoing caller ID, the communication devices involved in the communication event, the physical location of the communication devices, the time and the duration of the communication event, and the form of the communication (e.g. phone call, voice mail, text message, email, video, etc.). In some embodiments, the metadata information can include the history of the communication data such as, for example, unprocessed or new, reproduced from certain unprocessed data, transcribed from certain reproduced data, processing errors occurred during the reproduction and the transcription processes, reviewed by a certain reviewer, commented by a certain reviewer, modified by a certain reviewer, and deleted by a certain reviewer. In some embodiments, the metadata information can further include the error information generated by the information recognition processor 301 during the transcription process of the reproduced communication data. In some embodiments, the metadata processor 302 adds the metadata information to the reproduced communication data so that the metadata information can be stored with the reproduced communication data in a same file. In some embodiments, the metadata information is stored in a separate metadata information file and the metadata processor 302 creates a link between the metadata information file and the communication data so that the metadata information file can be traced and modified.

In some embodiments, the transcription processor 303 receives the recognized/translated information generated by the information recognition processor 301, and generates a transcript based on the recognized/translated information. In some embodiments, the transcription processor 303 further queries the synchronization clock processor 203 and obtains the synchronized clock or timing information, and adds timing information to the transcript (e.g. timestamps) based on the synchronized clock or timing information. The timing information added to the transcript can be used to synchronize the transcript with the reproduced communication data. In some embodiments, the transcript includes texts that are written in a reviewer readable language (e.g. English). In some embodiments, the transcript includes other form of information that can be understood by the reviewer (e.g. line-by-line codes, graphs, flow charts, etc.).

In some embodiments, the transcript generated for the reproduced communication data, the metadata created for the reproduced communication data, and the reproduced communication data are stored as transcribed communication data in the transcribed file database 305. In some embodiments, the transcribed communication data is stored in a transcribed communication file.

Figure 4:
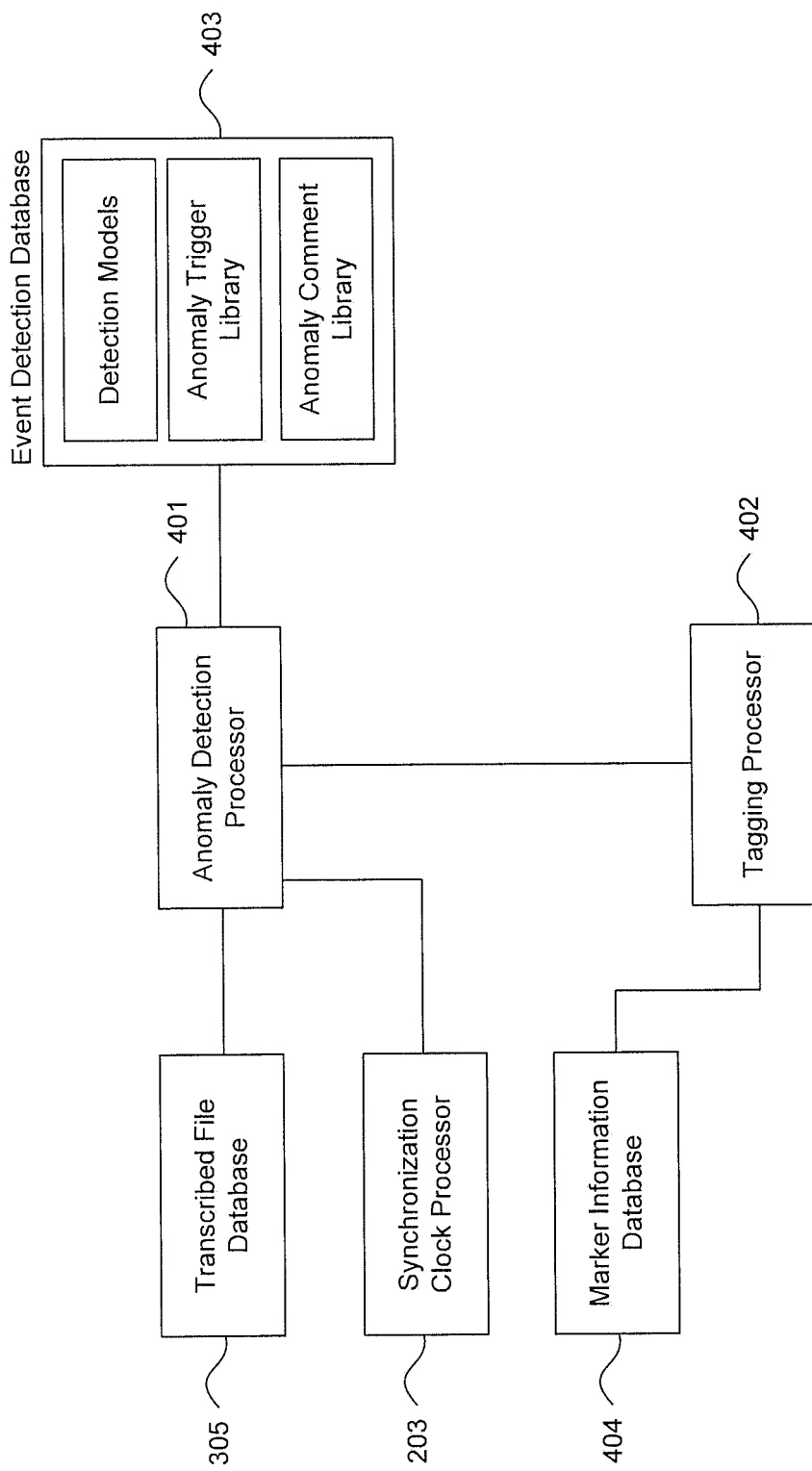
FIG. 4 illustrates a block diagram of an anomaly detection and tagging process, according to some embodiments of the present disclosure.

FIG. 4 illustrates a block diagram of an anomaly detection and tagging process 400, according to some embodiments. Referring to FIG. 4, the anomaly detection and tagging process 400 includes an anomaly detection processor 401, a tagging processor 402, an anomaly detection database 403, a marker information database 404, a transcribed file database 305, and a synchronization clock processor. In some embodiments, the synchronization clock processor 203, the anomaly detection processor 401, and the tagging processor 402 are components of the data processing system 101. In some embodiments, the transcribed file database 305, the anomaly detection database 403, and the marker information database 404 are components of the data server 102.

In some embodiments, the anomaly detection processor 401 is configured to retrieve the transcribed communication data stored in the transcribed file database 305. In some embodiments, the anomaly detection processor 401 retrieves the transcribed communication data from a transcribed communication file in the transcribed file database 305. In some embodiments, the anomaly detection processor 401 is configured to detect the anomalies in the transcribed communication data. In some embodiments, anomalies include inappropriate information such as, for example, a word, a topic, a location, a person, and an object on a pre-defined blacklist. In some embodiments, anomalies include other inappropriate information such as, for example, an abnormal behavior pattern, a three-way call, and un-recognized information.

In some embodiments, the detection of anomalies involves identifying and locating anomalies in the transcribed communication data that triggers an anomaly detection based on information provided in the anomaly detection database 403. In some embodiments, an anomaly detection is triggered if an anomaly in the transcribed communication data is detected. In some embodiments, the anomaly detection database 403 includes an anomaly trigger library. In some embodiments, the anomaly trigger library includes a blacklist of pre-defined information that can trigger an anomaly detection. In some embodiments, the blacklist of pre-defined information includes, but is not limited to, inappropriate words, topics, locations, persons, and objects. In some embodiments, the pre-defined information can further include abnormal behavior patterns, the occurrence of a three-way call, and the existence of un-recognized information. In some embodiments, the anomaly detection database 403 further includes detection models, and the anomaly detection processor 401 queries the detection models to detect the anomalies in the transcribed communication data. In some embodiments, a detection model divides the transcribed communication data into small portions, and an anomaly is triggered when a portion of the transcribed communication data matches information listed in the anomaly trigger library. In some embodiments, the detection model can include one or more sophisticated models including, but not limited to, classification based anomaly detection models, clustering based anomaly detection models, statistical based anomaly detection models, and other suitable anomaly detection models. The detection of anomalies in the transcribed information can also base on a statistical analysis of all the information available to the anomaly detection processor 401, instead of relying entirely on isolated and piece-by-piece information.

In some embodiments, upon a successful detection of an anomaly, the anomaly detection processor 401 identifies the portion of the transcribed communication data (e.g. a word, a sound, a picture, an object, and a person) that triggers or causes the anomaly detection, and generates the time location for the anomaly. In some embodiments, the time location of the anomaly is the time location of the portion of the transcribed communication data that triggers or causes the anomaly detection. In some embodiments, the time location of the anomaly includes a plurality of time locations, such as the starting time location and the ending time location of the portion of the transcribed communication data (e.g. a sentence in the transcript, a paragraph in the transcript, a session of a video recording, etc.), and multiple starting time locations and ending time locations for multiple portions of the transcribed communication data that trigger or cause the anomaly detection.

In some embodiments, the anomaly detection processor 401 is further configured to generate comments for the detected anomalies. In some embodiments, the anomaly detection processor 401 queries the anomaly detection database 403 and automatically generates comments for the detected anomalies based on information provided by an anomaly comment library. In some embodiments, the anomaly comment library includes a comments look-up table in which comments-anomaly pairs can be defined. In some embodiments, the anomaly detection processor is further configured to add, modify, and remove comments-anomaly pairs. In some embodiments, the comments include a full description of the detected anomaly, such as the original transcribed information that triggers the anomaly detection, the nature or the pattern of the anomaly detected (e.g. slang, offensive behavior, threatening language, etc.), a confidence level of anomaly detection, a list of all communication users in this communication event, and other useful information identifiable from the transcribed information.

In some embodiments, the anomaly detection processor 401 further generates time locations for the comments. In some embodiments, the time locations are generated to match the time locations of the portion of the transcribed communication data that triggers or causes the anomaly detection. In some embodiments, the anomaly detection processor 401 creates a link between the time locations of the comments and the time locations of the portion of the transcribed communication data that triggers or causes the anomaly detection, so that any change in the time locations of the transcribed communication data is automatically reflected in the time locations of the comments. In some embodiments, the time locations of the comments are separately generated by the anomaly detection processor 401 without directly related to the time locations of the time locations of the portion of the transcribed communication data that triggers or causes the anomaly detection, so that the time locations for the comments are stored and managed separately from the transcribed communication data.

In some embodiments, the tagging processor 402 is configured to receive the time locations of the anomalies detected by the anomaly detection processor, the comments for the detected anomalies, and the time locations of the comments, and generate a marker for each of the anomalies detected by the anomaly detection processor. In some embodiments, a marker is an indicator or a highlighter that is displayed when the transcribed communication data is displayed on a screen. In some embodiments, the marker can take different forms such as, for example, a notification marker at each time location for each anomaly, a highlighted box (covering a portion of text or portion of an image) for each anomaly, a colored background from each beginning time location to each end time location for each anomaly, a special format of texts from each beginning time location to each end time location for each anomaly, and other suitable forms of markers to indicate the presence of anomalies in the transcribed information.

In some embodiment, the generation of the marker by the tagging processor 402 includes assigning time locations for the marker. In some embodiments, the time locations for the marker are chosen to match the time locations for each of the anomalies so that the marker can be displayed alongside with the anomalies in the transcribed communication data. In some embodiments, the time locations of the marker are chosen to be specific time locations (e.g. a starting point of a page, an ending point of a page, a certain position in a summary page, etc.) for different purposes. In some embodiments, the generation of the marker by tagging processor 402 further includes choosing a proper format of the marker to be displayed. In some embodiments, the tagging processor 402 further creates links between the comments for the anomalies and the markers of the anomalies. The links between the comments and the markers can be used for display, review and edit purposes.

In some embodiments, the tagging processor 401 sends the information of the marker (e.g. the format of the marker, the time locations of the marker, the comments linked to the marker, and the links created between the comments and the marker, etc.) to a marker information database 404. In some embodiments, the marker information database 404 stores the information of the marker in a marker information file.

In some embodiments, the tagging processor 402 is further configured to retrieve information and modify the retrieved information from the marker information database 404.

Figure 5:
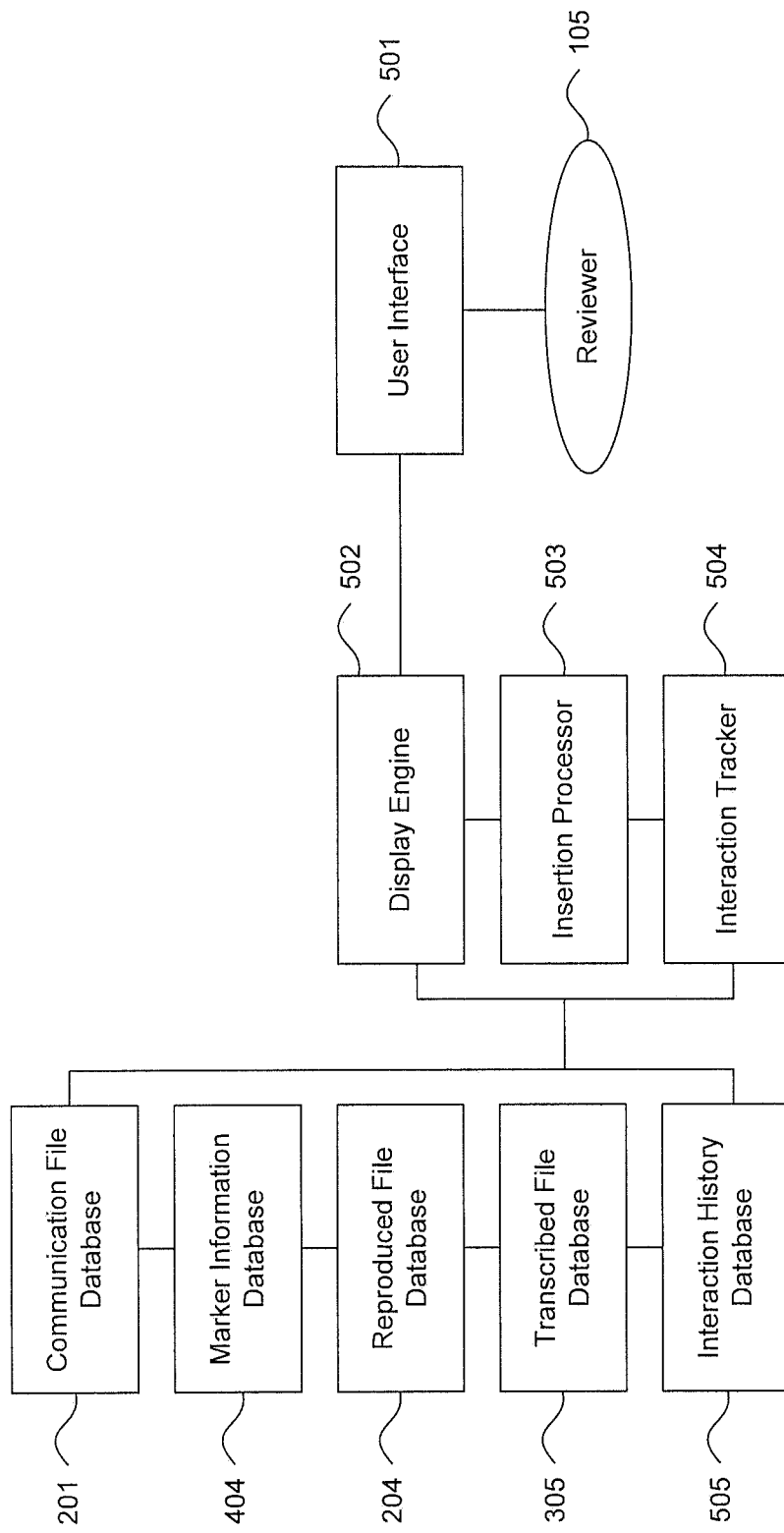
FIG. 5 illustrates a block diagram of a reviewer interaction process, according to some embodiments of the present disclosure.

FIG. 5 illustrates a block diagram of a reviewer interaction process 500, according to some embodiments. Referring to FIG. 5, the reviewer interaction process 500 includes a user interface 501, a display engine 502, an insertion processor 503, an interaction tracker 504, a marker information database 404, a transcribed file database 305, a reproduced file database 204, and a communication file database 201. In some embodiments, the user interface 501, display engine 502, insertion processor 503, and interaction tracker 504 are components of the data processing system 101. In some embodiments, the communication file database 201, the reproduced file database 204, the transcribed file database 305, the marker information database 404, and the interaction history database 505 are components of the data server 102.

In some embodiments, the user interface 501 allows interfacing between a reviewer 105 and the data processing system 101. In some embodiments, the user interface 501 is a graphical user interface (GUI). In some embodiments, the user interface 501 further includes input and output methods, such as, for example, a keyboard, a mouse, a touch screen, a microphone, a display screen, a speaker, and other suitable input and output methods.

In some embodiments, the display engine 502 is configured to receive inputs from the reviewer 105 via the user interface 501. According to the inputs, the display engine 502 is configured to retrieve data from the data server 102 (e.g. the marker information database 404, the transcribed file database 305, the reproduced file database 204, the communication file database 201, etc.), and send data to the user interface 501 for display purposes. In one embodiment, the display engine 502 is configured to allow the reviewer 105 to review the data stored the data server 102. The reviewer 105 first inputs a request using the user interface 501 to view all the information for a communication event (e.g. a voice recording with transcript recorded at a chosen time for a chosen inmate). The reviewer 105 can also directly inputs the transaction ID to quickly locate all the communication files related to the communication event. The display engine 502 receives the input from the user interface 501 and retrieve the data (e.g. the communication data, the reproduced communication data, and the transcribed communication data). The display engine 502 further sends the data to the user interface 501 so that the user interface displays the requested data to the reviewer 105 via an output method (e.g. a screen).

In some embodiments, the display engine 502 further retrieves the marker information from the marker information database 404 and send the information to the user interface 501. The user interface 501 then displays the markers and comments that are linked to the transcribed information being reviewed by the reviewer 105. In some embodiments, the markers can be displayed in different forms such as, for example, a notification marker at each time location for each anomaly, a highlighted box (covering a portion of text or portion of an image) for each anomaly, a colored background from each beginning time location to each end time location for each anomaly, a special format of texts from each beginning time location to each end time location for each anomaly, and other suitable forms of markers to indicate the presence of anomalies in the transcribed information. In some embodiments, the display engine 502 retrieves the comments, the time locations for the comments, and the links created for the comments, and sends these information to the user interface 501. Based on the time locations of the comments, or the links between the comments and the markers, the user interface 501 displays the comments together with the displayed transcribed information at their assigned time locations. In some embodiments, the display positions of the comments are determined by the time locations of the comments. For example, a transcribed video call has a transcript with synchronized timing information (e.g. timestamps). When the transcript is displayed on a screen, the display position of each word of the transcript correlates to a time location of the same word. As a result, the display position of the comments can be identified by the time location of the comments. In some embodiments, the comments are displayed together with the transcribed information (e.g. comments displayed alongside a text transcript or an image). In some embodiments, the comments are hided and only a marker is displayed at the time locations of the comments. The reviewer 105 can notice the presence of a marker indicating the existence of comments associated with the marker, and view the comments by moving the mouse over the marker. In some embodiments, the reviewer 105 can choose to display or not display the comments when reviewing the transcribed information.

In some embodiments, the reviewer 105 is able to interact and make edits to the data displayed by the user interface 501. In some embodiments, the interaction between the reviewer 105 and the data processing system 101 includes reviewing, inserting, removing, relocating, and modifying the reproduced communication data, the metadata, and the transcribed communication data. In some embodiments, the interaction between the reviewer 105 and the data processing system 101 also includes reviewing, inserting, removing, relocating, and modifying the time locations of the anomalies, the markers assigned to the anomalies, and the comments that are linked to the transcribed information.

In some embodiments, the reviewer 105 is able to insert a marker in the transcribed information via the user interface 501. In some embodiments, the reviewer 105 chooses a specific display position (e.g. a space between two words, space between two sentences, a word, a sentence, a paragraph, a portion of a photo, etc.) in the transcribed information by taking an insertion action (e.g. double clicking the mouse or right clicking the mouse) at the display position. The insertion processor 503 receives this insertion action from the reviewer 105 through the user interface 501, and identifies the time location of the inserted marker based on the correlation between the display position and the synchronized clock or timing information in the transcribed information. In some embodiments, the insertion processor 503 further creates a link between the chosen transcribed information (e.g. a word) and the new marker so that the new marker traces the chosen transcribed information. For example, the marker's time location traces the time location of the chosen transcribed information, so that a future change to the chosen transcribed information results in a corresponding change to the marker. In some embodiments, the insertion processor 503 further sends the marker information of the new marker (e.g. the time locations, the links created, and the format of the marker) to the marker information database 404 where the marker information can be stored.

In some embodiments, the reviewer 105 is able to insert comments in the transcribed information via the user interface 501. In some embodiments, the reviewer 105 chooses a specific display position (e.g. a space between two words, space between two sentences, a word, a sentence, a paragraph, a portion of a photo, etc.) in the transcribed information by taking a comment insertion action (e.g. double clicking the mouse or right clicking the mouse) at the display position. The reviewer 105 then puts in comments in a comment box that pops up at the display position. The insertion processor 503 receives this comment insertion action from the reviewer 105 through the user interface 501, and identifies the time location of the inserted comments. In some embodiments, the time location can be a specific time location correlated to a specific display position (e.g. the time location for a space between two words), or multiple time locations beginning from a first time location (e.g. the time location of a first letter in the first word in a chosen sentence) and ending at a second time location (e.g. the time location of a last letter in the first word in a chosen sentence). In some embodiments, the insertion processor 503 further creates a link between the chosen transcribed information (e.g. a word) and the inserted comments. In some embodiments, the insertion processor 503 further sends the comments, the time location of the comments, and the links created for the comments to the marker information database 404 where the comments information can be stored.

In some embodiments, the interaction tracker 504 is configured to track the interaction records of the reviewer 105. In some embodiments, the interactions of the reviewer include reviewing, inserting, removing, relocating, and modifying one or more portions of the reproduced communication data and transcribed communication data. In some embodiments, the interactions of the reviewer further include reviewing, inserting, removing, relocating, and modifying the time locations of the anomalies, the markers assigned to the anomalies, and the comments that are linked to the transcribed information. In some embodiments, the interaction records include the identity of the reviewer (e.g. name and/or ID of the reviewer), all the interactions conducted by the reviewer, and all the data generated during the interactions (e.g. comments insertion, marker modification, portions of the transcribed information that are reviewed by the reviewer, etc.). The interaction tracker 504 further sends the interaction records to the interaction history database 505. In some embodiments, the interaction history database 505 stores the interaction record in an interaction tracking file.

Figure 6:
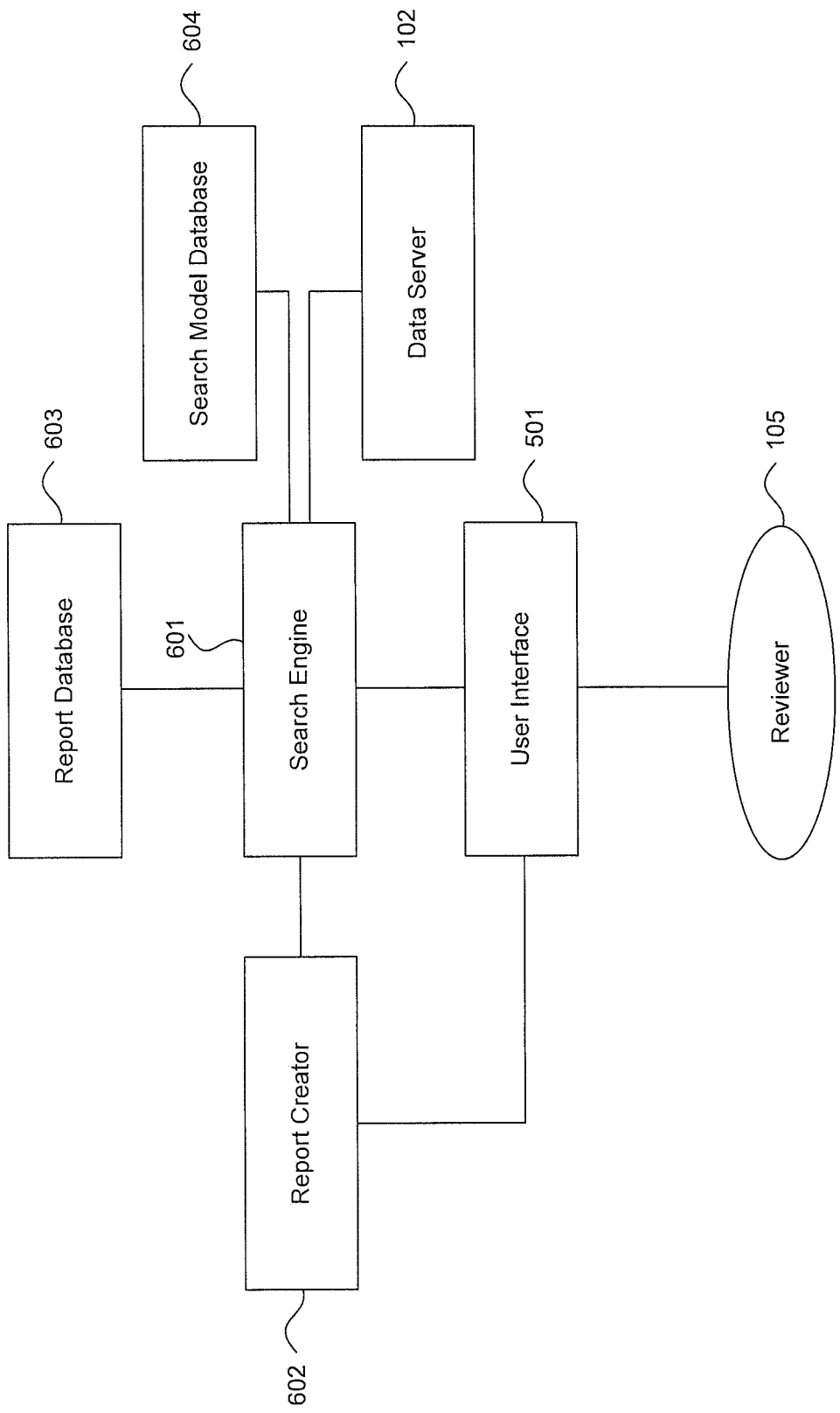
FIG. 6 illustrates a block diagram of a search and report process 600, according to some embodiments, according to some embodiments.

FIG. 6 illustrates a block diagram of a search and report process 600, according to some embodiments. Referring to FIG. 6, the search and report process 600 includes a search engine 601, a report creator 602, a report database 603, a search model database 604, a user interface 501, and a data server 102. In some embodiments, the search engine 601, the report creator 602, and the user interface 501 are components of the data processing system 101. In some embodiments, the report database 603 and the search model database 604 are components of the data server 102.

In some embodiments, the reviewer 105 is able to conduct information search. In some embodiments, the reviewer 105 can create a search request that contains search terms using the user interface 501. In some embodiments, the search engine 601 receives the search request from the user interface 501 and conducts the search. After the search is completed, the search engine 601 sends the search results to the user interface for display.

In some embodiments, the reviewer 105 can create search terms based on a plurality of information categories including, but not limited to transcribed information (e.g. certain words), reviewer information (e.g. a specific reviewer), anomaly information (e.g. whether any anomaly is detected and the type of the anomaly), marker information (whether a marker is present and the time locations of the markers), comments information (whether comments are present, whether user inserted comments are present, whether comments are modified, etc.), metadata information (e.g. whether a processing error is present), and interaction records (whether reviewed by a certain reviewer). In some embodiments, based on the search terms defined by the reviewer 105, the search engine 601 searches the data server 102 for all the information regarding the search terms (e.g. all the files containing the information about the search terms). In some embodiments, the search engine 601 queries the search model database 604 for a search model to be applied to the search process. In some embodiments, the search model database 604 includes search models such as, for example, keyword search models, fussy search models, concept search models, and other suitable search models and/or search algorithms.

In some embodiments, after searching the information hosted by the data server 102, the search engine 601 compiles a list of search result. In some embodiments, the search engine 601 further ranks and filters the search results (e.g. ranks and filters the list of search results by their relevance). In some embodiments, the search engine 601 further summarizes the search results in a search report with specific formats, and sends search results and the search report to the user interface 501 for displaying the information to the reviewer 105.

In some embodiments, the search report is canned search report with pre-defined formats and can be re-used. In some embodiments, the canned search reports are stored in a report database 603 so that the search engine 601 can query the report database 603 and re-use a canned search report with pre-defined formats. In some embodiments, the reviewer 105 can also use the report creator 602 to create a new search report with formats defined by the reviewer 105. In some embodiments, the search engine 601 runs the newly created search report as an ad-hoc search report for a one-time search. In some embodiments, the report creator 602 can send the formats of the newly created search report to the report database 603. The report database 603 stores the newly created search report as a new canned search report so that the newly created search report can be easily re-used for future information searches.

In some embodiments, the formats of a search report include, but are not limited to, the selection of items to be displayed in the search reports (e.g. the name of the reviewer, the time of creation, whether the data has been reproduced, transcribed, reviewed, modified, etc.), the arrangement of displayed items in the report (e.g. the number of search results in one page, displaying search results in a top to bottom list, displaying search results in a grid view, etc.), the algorithm of ranking the search results (e.g. rank by relevance, rank by creation time, rank by number of reviewers, etc.), and the display formats of each of the search results (e.g. a summary text, a full description, a summary view, etc.). In some embodiments, the formats of a search report further include pre-defined search terms (e.g. one or more pre-defined keywords that are added to the search) and pre-defined search conditions (e.g. the data source for the search, the time range of the data to be searched, and the form of data to be searched).

In some embodiments, the reviewer 105 is further able to modify the search report formats of a canned search report stored in the report database 603. In one embodiment, the reviewer 105 opens a canned report stored in the report database 603 through the user interface 501 and the report creator 602. The reviewer 105 uses the formats of the canned report as base formats and modifies the base formats through the user interface 501 and the report creator 602. The search engine 601 can run an ad-hoc search based on the modified search formats. The report creator 602 can send the modified canned search with modified formats to the report database 603, so that the modified search formats can be re-used.

In some embodiments, the reviewer 105 is further able to create a scheduled search report through the user interface 105 and the report creator 602. In some embodiments, the report creator 602 is configured to receive modify instructions from the reviewer 105 via the user interface 501. Based on the instructions from the reviewer 105, the report creator 602 is configured to generate search formats for the scheduled search report, by creating new search formats, modifying existing search formats, or directly using existing search formats. In some embodiments, the reviewer can define a specific time to run the scheduled search report, a frequency or an interval of running the scheduled search report (e.g. once a day, once a week, twice a month, etc.). In some embodiments, the reviewer can define the search terms and search conditions in the scheduled search report. In some embodiments, the report creator 602 sets up the formats of the scheduled search report and sets up the scheduled search frequency or interval automatically. In some embodiments, the search engine 601 is configured to analyze the search results of a scheduled search, and determines to narrow or widen the search terms or search conditions for the scheduled search. In some embodiments, the report creator 602 sends the search formats of the scheduled search report to the report database 603 so that the scheduled search report can be stored.

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 7:
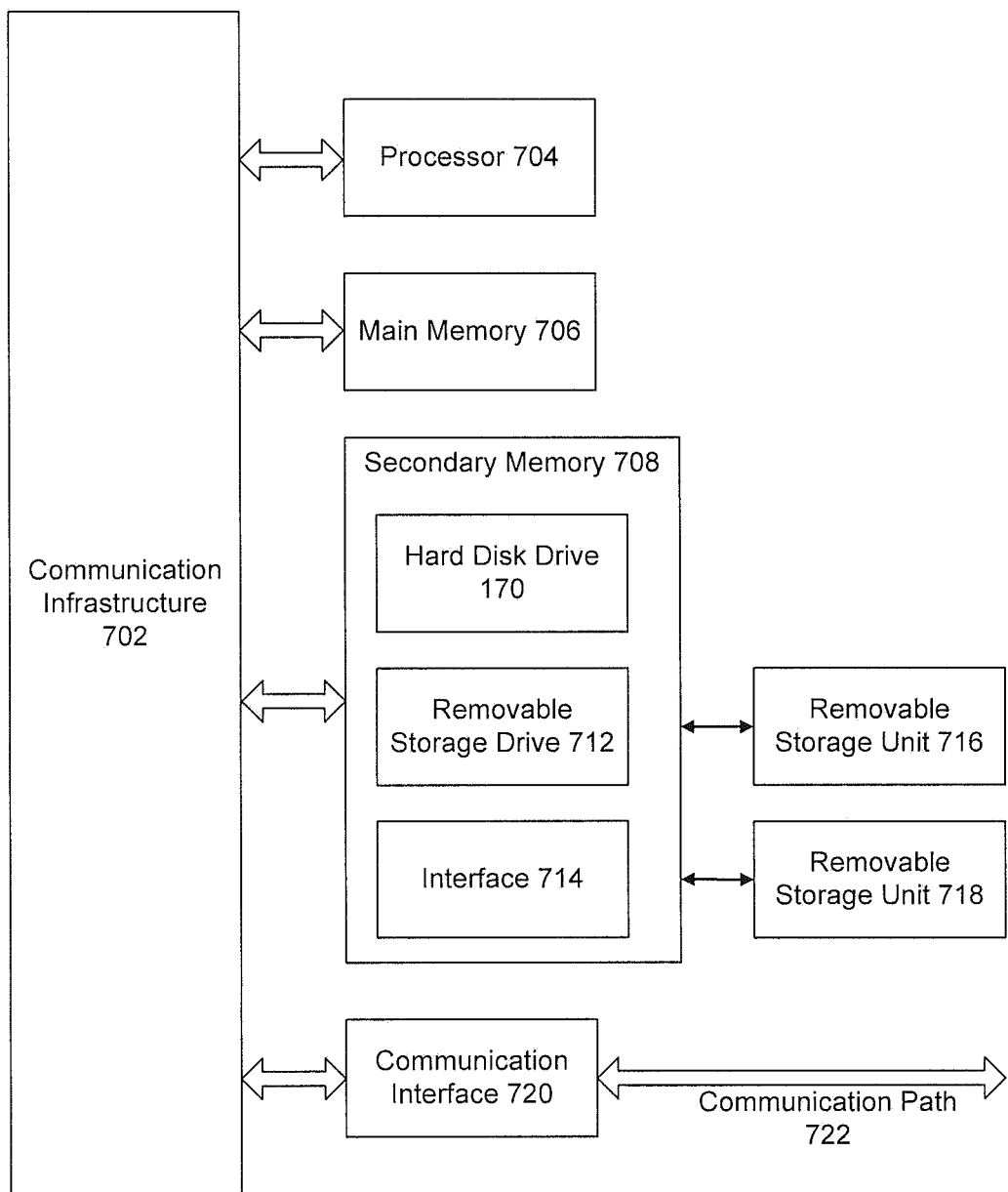
FIG. 7 illustrates a block diagram of an exemplary computer system, according to an exemplary embodiment of the present disclosure.

The following description of a general purpose computer system is provided for the sake of completeness. Embodiments of the present disclosure can be implemented in hardware, or as a combination of software and hardware. Consequently, embodiments of the disclosure are implemented in the environment of a computer system or other processing system. For example, the data processing system 101 and the data server 102 in FIG. 1, and the components of the data processing system 101 (e.g. information recognition processor 301, metadata processor 302, transcription processor 303, synchronization clock processor 203, information recognition database 304, reproduced file database 204, and transcribed file database 305 in FIG. 3) can be implemented in the environment of one or more computer systems or other processing systems. An example of such a computer system 700 is shown in FIG. 7. One or more of the processors and databases depicted in the previous figures can be at least partially implemented on one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 816 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A system for analyzing communication data involving an inmate of a controlled environment facility, comprising:
   a database that stores a recorded communication involving the inmate;
   an analysis subsystem, configured to:
     receive the recorded communication from the database;
     transcribe the received communication into a transcript using speech recognition processing;
     add synchronization information to the transcript using a synchronized global clock; and
     detect an anomaly in the recorded communication based on the transcript; and
   a review subsystem, configured to:
     provide the transcript and the synchronization information to a user for review;
     receive an annotation from the user at a location in the transcript via a user interface;
     identify a time location associated with the annotation based on the location of the annotation in the transcript and the synchronization information;
     link the annotation with a nearby word or phrase in the transcript; and
     link the annotation in the transcript with a corresponding time location in the recorded communication based on the synchronized global clock.

2. The system of claim 1, wherein the synchronization information includes timestamps corresponding to time-stamped locations within the recorded communication.

3. The system of claim 1, wherein the synchronized global clock is obtained using at least one of Cristian's algorithm, Berkeley algorithm, or Network Time Protocol.

4. The system of claim 1, wherein the analysis subsystem detects the anomaly by comparing information in the transcript to a database of pre-defined events.

5. The system of claim 1, wherein the database further includes metadata information relating to the recorded communication.

6. The system of claim 5, wherein the metadata information includes an identifier of the inmate, a physical location of the inmate at a time of the communication, a personal or criminal record of the inmate, and biometric information relating to the inmate.

7. The system of claim 6, wherein the analysis subsystem is configured to detect the anomaly based on the metadata information.

8. The system of claim 1, wherein the analysis subsystem is further configured to:
   mark the detected anomaly in the transcript; and
   display a confidence level in the transcript associated with the detected anomaly.

9. The system of claim 8, wherein the confidence level is a degree of certainty with respect to the detected anomaly.

10. The system of claim 1, wherein the analysis subsystem is further configured to make, in response to a modification to a time location of the nearby word in the transcript, a corresponding modification to the time location of the annotation in the transcript based on the link.

11. A method for analyzing communication data involving an inmate of a controlled environment facility, comprising:
    storing a recorded communication involving the inmate;
    transcribing the recorded communication into a transcript using speech recognition processing;
    adding synchronization information to the transcript using a synchronized global clock;
    detecting an anomaly in the recorded communication based on the transcript;
    providing the transcript and the synchronization information to a user for review;
    receiving an annotation from the user at a location in the transcript via a user interface;
    identifying a time location associated with the annotation based on the location of the annotation in the transcript and the synchronization information;
    linking the annotation with a nearby word or phrase in the transcript; and
    linking the annotation in the transcript with corresponding time locations in the recorded communication based on the synchronized global clock.

12. The method of claim 11, wherein the synchronization information includes timestamps corresponding to time-stamped locations within the recorded communication.

13. The method of claim 11, wherein the synchronized global clock is obtained using at least one of Cristian's algorithm, Berkeley algorithm, or Network Time Protocol.

14. The method of claim 11, wherein an analysis subsystem detects the anomaly by comparing information in the transcript to a database of pre-defined events.

15. The method of claim 11, wherein a database includes metadata information relating to the recorded communication.

16. The method of claim 15, wherein the metadata information includes an identifier of the inmate, a physical location of the inmate at a time of the communication, a personal or criminal record of the inmate, and biometric information relating to the inmate.

17. The method of claim 16, wherein the detecting of the anomaly is based on the metadata information.

18. The method of claim 11, further comprising:
    marking the detected anomaly in the transcript; and
    displaying a confidence level in the transcript associated with the detected anomaly.

19. The method of claim 18, wherein the confidence level is a degree of certainty with respect to the detected anomaly.

20. The method of claim 11, further comprising making, in response to a modification to a time location of the nearby word in the transcript, a corresponding modification to the time location of the annotation in the transcript based on the link.

* * * * *